(12) United States Patent
Takeuchi et al.

(10) Patent No.: US 6,526,261 B1
(45) Date of Patent: Feb. 25, 2003

(54) CONTROL METHOD OF TRANSMITTING POWER IN CELLULAR SYSTEM

(75) Inventors: Yoshio Takeuchi, Saitama (JP); Toshinori Suzuki, Tokyo (JP)

(73) Assignee: KDD Corporation, Tokyo (JP)

( * ) Notice: Subject to any disclaimer, the term of this patent is extended or adjusted under 35 U.S.C. 154(b) by 0 days.

(21) Appl. No.: 09/516,784

(22) Filed: Mar. 1, 2000

(30) Foreign Application Priority Data

Mar. 2, 1999 (JP) ............................................. 11-053896

(51) Int. Cl.[7] .................................................. H04Q 7/00
(52) U.S. Cl. .......................... 455/69; 455/522; 455/67.1
(58) Field of Search ............................ 455/522, 69, 70, 455/68, 67.1

(56) References Cited

U.S. PATENT DOCUMENTS

| | | | | |
|---|---|---|---|---|
| 5,396,516 A | * | 3/1995 | Padovani et al. | |
| 5,623,486 A | * | 4/1997 | Dohi et al. | |
| 6,259,927 B1 | * | 7/2001 | Butovitsch et al. | |
| 6,259,928 B1 | * | 7/2001 | Vembu | |

* cited by examiner

*Primary Examiner*—Thanh Cong Le
*Assistant Examiner*—Huy Nguyen
(74) *Attorney, Agent, or Firm*—Arent Fox Kintner Plotkin & Kahn, PLLC

(57) ABSTRACT

A control method of transmitting power in a cellular system includes a step of measuring a signal to interference power ratio of a received signal at said receiving side, a step of detecting frame errors of the received signal at the receiving side, a step of counting the number of the detected frame errors n(k) (k and n(k) are positive integers and $1 \leq k \leq K$) for every M(k) (M(k) is a positive integer) frames, or for last N(k) (N(k) is a positive integer) frames just before the frame error is detected, a step of adjusting a value of a target SIR depending on one or set of the counted numbers of frame error n(1) to n(K), a step of comparing the measured SIR with the adjusted target SIR to provide a compared result, and a step of controlling at the transmitting side the transmitting power depending on the compared result.

86 Claims, 11 Drawing Sheets

CONTROL METHOD OF TRANSMITTING POWER IN CELLULAR SYSTEM

FIELD OF THE INVENTION

The present invention relates to a control method of transmitting power in a cellular system with a transmitting side and a receiving side. The method compares a signal to interference power ratio (SIR) of a received signal at the receiving side with a target SIR, and then controls the transmitting power at the transmitting side depending upon the comparison result such as its difference and higher or lower.

DESCRIPTION OF THE RELATED ART

In general, a bidirectional radio link is connected between a base station and a mobile station in a cellular system. In a CDMA (Code Division Multiple Access) cellular system using a CDMA link which is one of radio links between the mobile station and the base station, all the mobile stations transmit uplink signals at the same frequency. Also, all the base stations transmit downlink signals at the same frequency. The frequency of the uplink signals differs from that of the downlink signals, and therefore FDD (Frequency Division Duplex) method is used.

Since the same frequency is used in the uplink or downlink transmission, transmitted signals from one mobile station or one base station will interfere with a signal from another mobile station or base station. The higher the transmitted power, the larger the interference of the transmitted signal. Thus, in the CDMA cellular system, both the mobile stations and the base stations control the transmitting power of them to hold down the transmitted power to necessary minimum and reducing the interference. In general, the transmitting power control at the mobile station is called as an uplink transmitting power control, and the transmitting power control at the base station is called as a downlink transmitting power control.

When performing the transmitting power control at the mobile station, the base station measures a received SIR of a received signal from this mobile station and compares the measured received SIR with a target SIR. If the received SIR is higher than the target SIR, the base station instructs the mobile station to reduce the transmitting power. If the received SIR is lower than the target SIR, the base station instructs the mobile station to increase the transmitting power.

The transmitting power control at the base station is similarly performed as the transmitting power control at the mobile station except that the mobile station and the base station change places.

According to the above-mentioned transmitting power control, the received SIR is substantially kept at constant. However, even if the received SIR is constant, a communication quality factor such as a frame error rate (FER) or a bit error rate is not always kept constant.

In order to keep the FER or the bit error rate at constant, an outer loop control method may be used. According to this outer loop control method, a target SIR is increased if a communication quality factor such as a FER or a bit error rate detected at the receiving side is worse than a desired quality factor, and the target SIR is reduced if the detected communication quality factor is better than the desired quality factor.

A first conventional outer loop control method is described for example in Usuda et al., "Effects of applying outer loop transmit power control to W-CDMA System", 1998 IEICE (Institute of Electronics, Information and Communication Engineers) General Conference, B-5-114, March 1998. In this method, a FER is measured by exponent weighting, the measured FER is compared with a target FER at every fixed number of frames and then a target SIR corresponding to the target Eb/Io described in the literature is increased or decreased by a predetermined value (the same value in increasing and in decreasing) depending upon the result of the comparison. A modified method of this is described in Higuchi et al., "Experimental performance of adaptive transmit power control using outer loop for wideband-CDMA", 1998 IEICE General Conference, B-5-92, March 1998. In the latter modified method, a FER is measured by counting the number of frame errors for every fixed number of frames.

In a second conventional outer loop control method, whether or not a frame error exists is detected for every frame. When there is a frame error, a constant value S1 makes a target SIR increase, and when there is no frame error, a constant value S2 decreases the target SIR. If the target FER is expressed by p, the long average FER will become equal to the target FER by determining S1 and S2 to satisfy the following equation;

$$S1 \times p = S2 \times (1-p).$$

First Problem

However, according to the first conventional outer loop control method, if the FER measurement time is short, the target SIR will be decreased because the measured FER may often zero when the probability of FER is substantially equal to the target FER. Namely, when the outer loop control becomes a steady state, the actual FER probability is higher than the target FER. In other words, according to the first conventional outer loop control method, a long measurement time equal to or longer than $1/p$ with respect to the target FER (=p) is necessarily required and therefore the required measurement time becomes extremely long when the target FER is low. Thus, the control may not quickly respond to change in the required SIR when it fast varies due to for example rapid change of environment.

Whereas, according to the second conventional outer loop control method, the difference between the increment amount of SIR S1 and the decrement amount of SIR S2 becomes large when the target FER is low. If the SIR increment amount S1 is increased, excess increasing of the target SIR will occur due to probable frame error generations under the conditions that the required SIR does not change, causing the average SIR to increase. This results that the average transmitting power at the transmitting side becomes higher than required. Contrary to this, if the SIR increment amount S1 is decreased, the SIR decrement amount S2 is decreased in proportional to it. Thus, the control may not quickly respond to change in the required SIR when it fast decreases due to for example rapid change of environment.

Second Problem

There may be a lower limit in the transmitting power due to for example functional restrictions of a unit. Thus, a state that the received SIR at the receiving side exceeds the target SIR and there is no frame error although the transmitting power has its lower limit may be happened. At such state, if the outer loop control is being executed, the target SIR will decrease without limits. After that, if the state changes into one with frame errors, since the target SIR was decreased to quite lower value than its correct required SIR, frame errors will occur at higher probability than the target FER until the target SIR comes back to its correct value by the above-mentioned outer loop control.

Third Problem

When control of changing on/off of transmission for every frame is performed at the transmitting side as in the DTX (Discontinuous Transmission) control, the receiving side may erroneously judge that a frame error is occurred at the off-transmission frame. In this case, if the above-mentioned outer loop control is executed, the FER is measured higher than the actual FER and thus the target SIR will become higher than required.

Fourth Problem

In CDMA cellular system, in general, handover operations such as soft handover operation and softer handover operation are adopted. At each of the handovers, a plurality of radio links are simultaneously connected. However, the required SIR who is necessary to obtain the target FER may vary depending on the number of the connected links and kinds of the handovers. In such case, if the above-mentioned outer loop control is carried out, response will be delayed due to change in the number of the connected links and kinds of the handovers causing many frame errors to occur and also causing the target SIR to increase higher than required.

SUMMARY OF THE INVENTION

It is therefore an object of the present invention to provide a control method of transmitting power in a cellular system, whereby at least one of the aforementioned first to fourth problems can be solved.

According to the present invention, a control method of transmitting power in a cellular system includes a step of measuring a SIR of a received signal at the receiving side, a step of detecting frame errors of the received signal at the receiving side, a step of counting the number of the detected frame errors n(k) (k and n(k) are positive integers and $1 \leq k \leq \leq K$) for every M(k) (M(k) is a positive integer) frames, or for last N(k) (N(k) is a positive integer) frames just before the frame error is detected, a step of adjusting a value of a target SIR depending on one or set of the counted numbers of frame error n(1) to n(K), a step of comparing the measured SIR with the adjusted target SIR to provide a compared result, and a step of controlling at the transmitting side the transmitting power depending on the compared result.

Since the spacing (M(k) frames) of the control for adjusting a target SIR can be set up independently of the number of frames (N(k) frames) equivalent to the period for counting the number of frame errors, the degree of freedom at the time of carrying out the present invention can increase. Namely, if M(k) is set up smaller than N(k), the delay time from a frame error occurrence to the adjustment of the SIR can be made small. Thus, it is possible to respond to rapid change of the required SIR. Also, by setting up only M(k) greatly, the throughput for performing a present invention can be reduced.

It is preferred that wherein, in case of K=1, the adjusting step includes comparing the counted number of frame error n(1) with thresholds t1 and t2 (t1 $\geq$ t2), increasing the value of the target SIR by a value S1 when n(1) $\geq$ t1, and decreasing the value of the target SIR by a value S2 when n(1) $\leq$ t2.

It is also preferred that, in case that there is a difference $\Delta$SIR between the target SIR and a required SIR which satisfies a target FER, the adjusting step further includes setting the values S1 and S2 to satisfy equation of $$S1 \times P1 - S2 \times P2 = \Delta SIR$$

where P1 is a probability of that relationship of the number of frame errors n(1) with respect to the threshold t1 becomes n(1) $\geq$ t1, and P2 is a probability of that relationship of the number of frame errors n(1) with respect to the threshold t2 becomes n(1) $\leq$ t2.

It is preferred that, in case that there is a difference $\Delta$SIR between the target SIR and a required SIR which satisfies a target FER, the adjusting step further includes setting the values S1 and S2 to satisfy equation of $$10^{\hat{}}(S1/10) \times P1 + 10^{\hat{}}(-S2/10) \times P2 + (1-P1-P2) = 10^{\hat{}}(\Delta SIR/10)$$

where P1 is a probability of that relationship of the number of frame errors n(1) with respect to the threshold t1 becomes n(1) $\geq$ t1, and P2 is a probability of that relationship of the number of frame errors n(1) with respect to the threshold t2 becomes n(1) $\leq$ t2.

The difference $\Delta$SIR may be set to a value equal to or higher than −2 dB and lower than 0 dB, or a value equal to or lower than 2 dB and higher than 0 dB.

It is preferred that the adjusting step further includes setting the values S1 and S2 to satisfy equation of $$S1 \times P1 = S2 \times P2$$

where P1 is a probability of that relationship of the number of frame errors n(1) with respect to the threshold t1 becomes n(1) $\geq$ t1 when a FER is equal to the target FER, and P2 is a probability of that relationship of the number of frame errors n(1) with respect to the threshold t2 becomes n(1) $\leq$ t2 when the FER is equal to the target FER.

It is also preferred that the adjusting step further includes setting the values S1 and S2 to satisfy equation of $$10^{\hat{}}(S1/10) \times P1 + 10^{\hat{}}(-S2/10) \times P2 = P1 + P2$$

where P1 is a probability of that relationship of the number of frame errors n(1) with respect to the threshold t1 becomes n(1) $\geq$ t1 when a FER is equal to the target FER, and P2 is a probability of that relationship of the number of frame errors n(1) with respect to the threshold t2 becomes n(1) $\leq$ t2 when the FER is equal to the target FER.

It is preferred that the method further has preparing a table for storing increase and decrease values of target SIR corresponding to the number of frame errors n(1), and that, in case of K=1, the adjusting step includes obtaining an increase or decrease value from the table depending on a newest number of frame error n(1) when it is updated, and increasing or decreasing the value of the target SIR by the obtained value.

It is preferred that, in case that there is a difference $\Delta$SIR between the target SIR and a required SIR which satisfies a target FER, the increase and decrease values of target SIR stored in the table are set to satisfy equation of $$\sum_{i=0}^{N} S(i) \times P(i) = \Delta SIR$$

where P(i) is a probability of that the number of frame errors n(1) becomes equal to i ($0 \leq i \leq N = N(1)$), and S(i) is the increase and decrease value of the target SIR when the of frame errors n(1) is equal to i ($0 \leq i \leq N = N(1)$) and when increasing and decreasing are indicated by positive and negative polarities.

It is also preferred that, in case that there is a difference $\Delta$SIR between the target SIR and a required SIR which satisfies a target FER, the increase and decrease values of target SIR stored in the table are set to satisfy equation of $$\sum_{i=0}^{N} 10^{\wedge}(S(i)/10) \times P(i) = 10^{\wedge}(\Delta SIR/10)$$

where P(i) is a probability of that the number of frame errors n(1) becomes equal to i ($0 \leq i \leq N=N(1)$), and S(i) is the increase and decrease value of the target SIR when the of frame errors n(1) is equal to i ($0 \leq i \leq N=N(1)$) and when increasing and decreasing are indicated by positive and negative polarities.

The difference ΔSIR may be set to a value equal to or higher than −2 dB and lower than 0 dB, or a value equal to or lower than 2 dB and higher than 0 dB.

It is preferred that the increase and decrease values of target SIR stored in the table are set to satisfy equation of $$\sum_{i=0}^{N} S(i)P(i) = 0$$

where P(i) is a probability of that the number of frame errors n(1) becomes equal to i ($0 \leq i \leq N=N(1)$) when a FER is equal to the target FER, and S(i) is the increase and decrease value of the target SIR when the of frame errors n(1) is equal to i ($0 \leq i \leq N=N(1)$) and when increasing and decreasing are indicated by positive and negative polarities.

It is also preferred that the increase and decrease values of target SIR stored in the table are set to satisfy equation of $$\sum_{i=0}^{N} 10^{\wedge}(S(i)/10) \times P(i) = 1$$

where P(i) is a probability of that the number of frame errors n(1) becomes equal to i ($0 \leq i \leq N=N(1)$) when a FER is equal to the target FER, and S(i) is the increase and decrease value of the target SIR when the of frame errors n(1) is equal to i ($0 \leq i \leq N=N(1)$) and when increasing and decreasing are indicated by positive and negative polarities.

The number of frames N(1) may be equal to the number of frames M(1).

Preferably, the adjusting step is stopped from doing during N(1) frames just after the target SIR is once adjusted.

It is preferred that, in case of K=2, the adjusting step includes comparing the counted numbers of frame error n(1) and n(2) with thresholds t1 and t2 (t1≧t2), increasing the value of the target SIR by a value S1 when n(1)≧t1, and decreasing the value of the target SIR by a value S2 when n(2)≦t2.

It is more preferred that, in case that there is a difference ΔSIR between the target SIR and a required SIR which satisfies a target FER, the adjusting step further includes setting the values S1 and S2 to satisfy equation of $$S1 \times P1 - S2 \times P2 = \Delta SIR$$

where P1 is a probability of that relationship of the number of frame errors n(1) with respect to the threshold t1 becomes n≧t1, and P2 is a probability of that relationship of the number of frame errors n(2) with respect to the threshold t2 becomes n(2)≦t2.

It is also preferred that, in case that there is a difference ΔSIR between the target SIR and a required SIR which satisfies a target FER, the adjusting step further includes setting the values S1 and S2 to satisfy equation of $$10^{\wedge}(S1/10) \times P1 + 10^{\wedge}(-S2/10) \times P2 + (1-P1-P2) = 10^{\wedge}(\Delta SIR/10)$$

where P1 is a probability of that relationship of the number of frame errors n(1) with respect to the threshold t1 becomes n(1)≧t1, and P2 is a probability of that relationship of the number of frame errors n(2) with respect to the threshold t2 becomes n(2)≦t2.

The difference ΔSIR may be set to a value equal to or higher than −2 dB and lower than 0 dB, or a value equal to or lower than 2 dB and higher than 0 dB.

It is preferred that the adjusting step further includes setting the values S1 and S2 to satisfy equation of $$S1 \times P1 = S2 \times P2$$

where P1 is a probability of that relationship of the number of frame errors n(1) with respect to the threshold t1 becomes n(1)≧t1 when a FER is equal to the target FER, and P2 is a probability of that relationship of the number of frame errors n(2) with respect to the threshold t2 becomes n(2)≦t2 when the FER is equal to the target FER.

It is also preferred that the adjusting step further includes setting the values S1 and S2 to satisfy equation of $$10^{\wedge}(S1/10) \times P1 + 10^{\wedge}(-S2/10) \times P2 = P1 + P2$$

where P1 is a probability of that relationship of the number of frame errors n(1) with respect to the threshold t1 becomes n(1)≧t1 when a FER is equal to the target FER, and P2 is a probability of that relationship of the number of frame errors n(2) with respect to the threshold t2 becomes n(2)≦t2 when the FER is equal to the target FER.

Preferably, the adjusting step is stopped from doing during N(1) frames just after the target SIR is once increased and during N(2) frames just after the target SIR is once decreased.

It is preferred that the method further includes preparing a table for storing increase and decrease values of target SIR corresponding to a set of the numbers of frame errors (n(1), n(2), . . . , n(K)), and that the adjusting step includes obtaining an increase or decrease value from the table depending on a newest set of the numbers of frame error (n(1), n(2), . . . , n(K)) when one of the numbers of frame errors n(1), n(2), . . . , n(K) is updated, and increasing or decreasing the value of the target SIR by the obtained value.

It is more preferred that, in case that there is a difference ΔSIR between the target SIR and a required SIR which satisfies a target FER, the increase and decrease values of target SIR stored in the table are set to satisfy equation of $$\sum_{i(1)=0}^{N(1)} \sum_{i(2)=0}^{N(2)} \ldots \sum_{i(K)=0}^{N(K)} S(i(1), i(2), \ldots, i(K)) \times P(i(1), i(2), \ldots, i(K)) = \Delta SIR$$

where P(i(1), i(2), . . . , i(K)) ($0 \leq i(k) \leq N(k)$, $1 \leq k \leq K$) is a probability of that the set of the numbers of frame errors (n(1), n(2), . . . , n(K)) becomes equal to (i(1), i(2), . . . , i(K)), and S(i(1), i(2), . . . , i(K)) is the increase and decrease value of target SIR when the set of the numbers of frame errors (n(1), n(2), . . . , n(K)) is equal to (i(1), i(2), . . . , i(K)) and when increasing and decreasing are indicated by positive and negative polarities, respectively.

It is also preferred that, in case that there is a difference ΔSIR between the target SIR and a required SIR which satisfies a target FER, the increase and decrease values of target SIR stored in the table are set to satisfy equation of $$\sum_{i(1)=0}^{N(1)}\sum_{i(2)=0}^{N(2)}\ldots\sum_{i(K)=0}^{N(K)} 10^{\wedge}(S(i(1),i(2),\ldots,i(K))/10)\times P(i(1),i(2),\ldots,i(K)) =$$

$$10^{\wedge}(\Delta SIR/10)$$

where $P(i(1), i(2), \ldots, i(K))$ ($0 \leq i(k) \leq N(k)$, $1 \leq k \leq K$) is a probability of that the set of the numbers of frame errors $(n(1), n(2), \ldots, n(K))$ becomes equal to $(i(1), i(2), \ldots, i(K))$, and $S(i(1), i(2), \ldots, i(K))$ is the increase and decrease value of target SIR when the set of the numbers of frame errors $(n(1), n(2), \ldots, n(K))$ is equal to $(i(1), i(2), \ldots, i(K))$ and when increasing and decreasing are indicated by positive and negative polarities, respectively.

The difference $\Delta SIR$ may be set to a value equal to or higher than −2 dB and lower than 0 dB, or a value equal to or lower than 2 dB and higher than 0 dB.

It is preferred that the increase and decrease values of target SIR stored in the table are set to satisfy equation of $$\sum_{i(1)=0}^{N(1)}\sum_{i(2)=0}^{N(2)}\ldots\sum_{i(K)=0}^{N(K)} S(i(1),i(2),\ldots,i(K))P(i(1),i(2),\ldots,i(K)) = 0$$

where $P(i(1), i(2), \ldots, i(K))$ ($0 \leq i(k) \leq N(k)$, $1 \leq k \leq K$) is a probability of that the set of the numbers of frame errors $(n(1), n(2), \ldots, n(K))$ becomes equal to $(i(1), i(2), \ldots, i(K))$ when a FER is equal to the target FER, and $S(i(1), i(2), \ldots, i(K))$ is the increase and decrease value of target SIR when the set of the numbers of frame errors $(n(1), n(2), \ldots, n(K))$ is equal to $(i(1), i(2), \ldots, i(K))$ and when increasing and decreasing are indicated by positive and negative polarities, respectively.

It is also preferred that the increase and decrease values of target SIR stored in the table are set to satisfy equation of $$\sum_{i(1)=0}^{N(1)}\sum_{i(2)=0}^{N(2)}\ldots\sum_{i(K)=0}^{N(K)} 10^{\wedge}(S(i(1),i(2),\ldots,i(K))/10)\times P(i(1),i(2),\ldots,i(K)) = 1$$

where $P(i(1), i(2), \ldots, i(K))$ ($0 \leq i(k) \leq N(k)$, $1 \leq k \leq K$) is a probability of that the set of the numbers of frame errors $(n(1), n(2), \ldots, n(K))$ becomes equal to $(i(1), i(2), \ldots, i(K))$ when a FER is equal to the target FER, and $S(i(1), i(2), \ldots, i(K))$ is the increase and decrease value of target SIR when the set of the numbers of frame errors $(n(1), n(2), \ldots, n(K))$ is equal to $(i(1), i(2), \ldots, i(K))$ and when increasing and decreasing are indicated by positive and negative polarities, respectively.

Preferably, the adjusting step is stopped from doing during frames just after the target SIR is once adjusted.

It is preferred that the method further includes preparing a table for storing increase and decrease values of target SIR corresponding to the numbers of frame errors $n(1), n(2), \ldots, n(K)$, respectively, and that the adjusting step includes obtaining an increase or decrease value from the table depending on a newest one $n(k)$ of the numbers of frame error $n(1), n(2), \ldots, n(K)$ when the number of frame errors $n(k)$ is updated, and increasing or decreasing the value of the target SIR by the obtained value.

It is also preferred that, in case that there is a difference $\Delta SIR$ between the target SIR and a required SIR which satisfies a target FER, the increase and decrease values of target SIR stored in the table are set to satisfy equation of $$\sum_{k=0}^{K}\sum_{i(k)=0}^{N(k)} \frac{1}{M(k)} S(k, i(k)) \times P(k, i(k)) = \Delta SIR$$

where $P(k, i(k))$ is a probability of that the number of frame errors during $N(k)$ frames $n(k)$ becomes equal to $i(k)$ ($0 \leq i(k) \leq N(k)$), and $S(k, i(K))$ is the increase and decrease value of target SIR when the number of frame errors $n(k)$ is equal to $i(k)$ and when increasing and decreasing are indicated by positive and negative polarities, respectively.

It is preferred that, in case that there is a difference $\Delta SIR$ between the target SIR and a required SIR which satisfies a target FER, the increase and decrease values of target SIR stored in the table are set to satisfy equation of $$\sum_{k=0}^{K}\sum_{i(k)=0}^{N(k)} \frac{1}{M(k)} 10^{\wedge}S(k, i(k)/10)) \times P(k, i(k)) = 10^{\wedge}(\Delta SIR/10)$$

where $P(k, i(k))$ is a probability of that the number of frame errors during $N(k)$ frames $n(k)$ becomes equal to $i(k)$ ($0 \leq i(k) \leq N(k)$), and $S(k, i(K))$ is the increase and decrease value of target SIR when the number of frame errors $n(k)$ is equal to $i(k)$ and when increasing and decreasing are indicated by positive and negative polarities, respectively.

The difference $\Delta SIR$ may be set to a value equal to or higher than −2 dB and lower than 0 dB, or a value equal to or lower than 2 dB and higher than 0 dB.

It is preferred that the increase and decrease values of target SIR stored in the table are set to satisfy equation of $$\sum_{k=1}^{K}\sum_{i(k)=0}^{N(k)} \frac{1}{M(k)} S(k, i(k)) \times P(k, i(k)) = 0$$

where $P(k, i(k))$ is a probability of that the number of frame errors during $N(k)$ frames $n(k)$ becomes equal to $i(k)$ ($0 \leq i(k) \leq N(k)$) when a FER is equal to the target FER, and $S(k, i(K))$ is the increase and decrease value of target SIR when the number of frame errors $n(k)$ is equal to $i(k)$ and when increasing and decreasing are indicated by positive and negative polarities, respectively.

It is also preferred that the increase and decrease values of target SIR stored in the table are set to satisfy equation of $$\sum_{k=0}^{K}\sum_{i(k)=0}^{N(k)} \frac{1}{M(k)} 10^{\wedge}S(k, i(k))/10) \times P(k, i(k)) = 1$$

where $P(k, i(k))$ is a probability of that the number of frame errors during $N(k)$ frames $n(k)$ becomes equal to $i(k)$ ($0 \leq i(k) \leq N(k)$) when a FER is equal to the target FER, and $S(k, i(K))$ is the increase and decrease value of target SIR when the number of frame errors $n(k)$ is equal to $i(k)$ and when increasing and decreasing are indicated by positive and negative polarities, respectively.

Preferably, the adjusting step is stopped from doing during frames just after the target SIR is once adjusted.

According to the present invention, a control method of transmitting power in a cellular system includes a step of measuring a SIR of a received signal at the receiving side, a step of detecting frame errors of the received signal at the receiving side, a step of counting the number of frames until the number of the detected frame errors becomes m (m is a positive integer) to provide a counted number of frames C each time m frame errors being detected, a step of adjusting a value of a target SIR depending on the counted number of frames C, a step of comparing the measured SIR with the adjusted target SIR to provide a compared result, and a step of controlling at the transmitting side the transmitting power depending on the compared result.

It is preferred that the adjusting step includes comparing the counted number of frames C with thresholds t1 and t2 (t1≦t2), increasing the value of the target SIR by a value S1 when C≦t1, and decreasing the value of the target SIR by a value S2 when C≧t2.

It is more preferred that, in case that there is a difference ΔSIR between the target SIR and a required SIR which satisfies a target FER, the adjusting step further includes setting the values S1 and S2 to satisfy equation of $$S1 \times P1 - S2 \times P2 = \Delta SIR$$

where P1 is a probability of that relationship of the number of frame errors n with respect to the threshold t1 becomes n≧t1, and P2 is a probability of that relationship of the number of frame errors n with respect to the threshold t2 becomes n≦t2.

It is also preferred that, in case that there is a difference ΔSIR between the target SIR and a required SIR which satisfies a target FER, the adjusting step further includes setting the values S1 and S2 to satisfy equation of $$10^{\wedge}(S1/10) \times P1 + 10^{\wedge}(-S2/10) \times P2 + (1-P1-P2) = 10^{\wedge}(\Delta SIR/10)$$

where P1 is a probability of that relationship of the number of frame errors n with respect to the threshold t1 becomes n≧t1, and P2 is a probability of that relationship of the number of frame errors n with respect to the threshold t2 becomes n≦t2.

The difference ΔSIR may be set to a value equal to or higher than −2dB and lower than 0 dB, or a value equal to or lower than 2 dB and higher than 0 dB.

It is preferred that the adjusting step further includes setting the values S1 and S2 to satisfy equation of $$S1 \times P1 = S2 \times P2$$

where P1 is a probability of that relationship of the counted number of frames C with respect to the threshold t1 becomes C≦t1 when a FER is equal to the target FER, and P2 is a probability of that relationship of the counted number of frames C with respect to the threshold t2 becomes C≧t2 when the FER is equal to the target FER.

It is also preferred that the adjusting step further includes setting the values S1 and S2 to satisfy equation of $$10^{\wedge}(S1/10) \times P1 + 10^{\wedge}(-S2/10) \times P2 = P1 + P2$$

where P1 is a probability of that relationship of the counted number of frames C with respect to the threshold t1 becomes C≦t1 when a FER is equal to the target FER, and P2 is a probability of that relationship of the counted number of frames C with respect to the threshold t2 becomes C≧t2 when the FER is equal to the target FER.

It is preferred that the method further includes preparing a table for storing increase and decrease values of target SIR corresponding to the number of frames C, and that the adjusting step includes obtaining an increase or decrease value from the table depending on a newest number of frames C when it is updated, and increasing or decreasing the value of the target SIR by the obtained value.

It is more preferred that the increase and decrease values of target SIR stored in the table are set to satisfy equation of $$\sum_{i=m}^{\infty} S(i)P(i) = 0$$

where P(i) is a probability of that the number of frames C becomes equal to i (m≦i) when a FER is equal to the target FER, and S(i) is the increase and decrease value of target SIR when the number of frames C is equal to i and when increasing and decreasing are indicated by positive and negative polarities, respectively.

According to the present invention, a control method of transmitting power in a cellular system includes a step of measuring a SIR of a received signal at the receiving side, a step of detecting frame errors of the received signal at the receiving side, a step of adjusting a value of a target SIR depending on the detected frame errors, a step of comparing the measured SIR with the target SIR to provide a compared result, a step of controlling at the transmitting side the transmitting power depending on the compared result, a step of judging at the receiving side whether the controlled transmitting power at the transmitting side is at a lower limit level, and a step of prohibiting the adjustment of the value of the target SIR when the judging step judges that the transmitting power is at the lower limit level.

It is preferred that the method further includes a step of sending information indicating that the controlled transmitting power at the transmitting side is at the lower limit level from the transmitting side to the receiving side, and that the judging step includes judging that the controlled transmitting power is at the lower limit level when the information is received at the receiving side.

It is also preferred that the judging step includes monitoring that the measured SIR is higher than the target SIR, and judging that the controlled transmitting power is at the lower limit level when the measured SIR is higher than the target SIR for a predetermined period or more.

According to the present invention, a control method of transmitting power in a cellular system includes a step of measuring a SIR of a received signal at the receiving side, a step of detecting change in the number of connecting cells due to the soft handover or the softer handover, a step of adjusting a value of a target SIR depending on the detected change of the number of the connecting cells, a step of comparing the measured SIR with the target SIR to provide a compared result, and a step of controlling at the transmitting side the transmitting power depending on the compared result.

According to the present invention, a control method of transmitting power in a cellular system includes a step of measuring a SIR of a received signal at the receiving side, a step of detecting change in the number of connecting cells due to the soft handover or the softer handover, a step of adjusting a value of a target SIR depending on the detected change of the number of the connecting cells and on kind of the handovers, a step of comparing the measured SIR with the target SIR to provide a compared result, and a step of controlling at the transmitting side the transmitting power depending on the compared result.

It is preferred that the transmitting side executes control of changing on/off of transmission for every frame, and that the method further includes a step of removing the off-transmission frame from the counted number of frames and also from the counted number of frame errors, and a step of controlling the number of frames N(k) except for the off-transmission frame at constant.

It is also preferred that the transmitting side executes control of changing on/off of transmission for every frame, and that the method further includes a step of removing the off-transmission frame from the counted number of frames and also from the counted number of frame errors, and a step of controlling the number of frame errors m except for the off-transmission frame at constant.

It is preferred that the transmitting side executes control of changing on/off of transmission for every frame, and that the method further includes a step of removing the off-transmission frame from the counted number of frames and also from the counted number of frame errors, and a step of regarding the number of frames except for the off-transmission frame within a period as the number of frames N(k).

It is also preferred that the numbers of frames M(k) and N(k) are time-varying values.

Preferably, the thresholds t1 and t2 are time-varying values.

Also, preferably, the value m is a time-varying value.

It is preferred that the numbers of frames M(k) and N(k), the thresholds t1 and t2, the increase value S1 and the decrease value S2 are informed from the transmitting side to the receiving side.

It is also preferred that the numbers of frames M(k) and N(k) and the increase or decrease value are informed from the transmitting side to the receiving side.

It is preferred that the numbers of frames M(k) and N(k), the thresholds t1 and t2, the increase value S1 and the decrease value S2 are informed from the transmitting side to the receiving side.

It is preferred that the numbers of frames M(k) and N(k) and the increase or decrease value are informed from the transmitting side to the receiving side.

It is preferred that the numbers of frames M(k) and N(k) and the increase or decrease value are informed from the transmitting side to the receiving side.

It is also preferred that the value m, the thresholds t1 and t2, the increase value S1 and the decrease value S2 are informed from the transmitting side to the receiving side.

It is preferred that the value m and the increase or decrease value are informed from the transmitting side to the receiving side.

According to the present invention, a control method of transmitting power in a cellular system includes a step of measuring a power of a received signal at the receiving side, a step of detecting frame errors of the received signal at the receiving side, a step of counting the number of the detected frame errors n(k) (k and n(k) are positive integers and $1 \leq k \leq K$) for every M(k) (M(k) is a positive integer) frames, or for last N(k) (N(k) is a positive integer) frames just before the frame error is detected, a step of adjusting a value of a target power depending on one or set of the counted numbers of frame error n(1) to n(K), a step of comparing the measured received signal power with the adjusted target power to provide a compared result, and a step of controlling at the transmitting side the transmitting power depending on the compared result.

It is preferred that, in case of K=1, the adjusting step includes comparing the counted number of frame error n(1) with thresholds t1 and t2 (t1≧t2), increasing the value of the target power by a value S1 when n(1)≧t1, and decreasing the value of the target power by a value S2 when n(1)≦t2.

In this case, preferably, the adjusting step further includes setting the values S1 and S2 to satisfy equation of $$S1 \times P1 = S2 \times P2$$

where P1 is a probability of that relationship of the number of frame errors n(1) with respect to the threshold t1 becomes n(1)≧t1 when a frame error rate is equal to the target frame error rate, and P2 is a probability of that relationship of the number of frame errors n(1) with respect to the threshold t2 becomes n(1)≦t2 when the frame error rate is equal to the target frame error rate.

It is also preferred that the method further includes preparing a table for storing increase and decrease values of target power corresponding to the number of frame errors n(1), and that, in case of K=1, the adjusting step includes obtaining an increase or decrease value from the table depending on a newest number of frame error n(1) when it is updated, and increasing or decreasing the value of the target power by the obtained value.

In this case, preferably, the increase and decrease values of target power stored in the table are set to satisfy equation of $$\sum_{i=0}^{N} S(i)P(i) = 0$$

where P(i) is a probability of that the number of frame errors n(1) becomes equal to i (0≦i≦N =N(1)) when a frame error rate is equal to the target frame error rate, and S(i) is the increase and decrease value of the target power when the of frame errors n(1) is equal to i (0≦i≦N=N(1)) and when increasing and decreasing are indicated by positive and negative polarities.

Further objects and advantages of the present invention will be apparent from the following description of the preferred embodiments of the invention as illustrated in the accompanying drawings.

DESCRIPTION OF THE PREFERRED EMBODIMENTS

Typical embodiments of a control method of transmitting power in a cellular system will be described with reference to the above-mentioned drawings. In this description, a transmitting side and a receiving side mean a base station and a mobile station, or a mobile station and a base station, respectively. Namely, when the transmitting side is the base station, the receiving side is the mobile station, and vice versa.

First Embodiment

Figure 1:
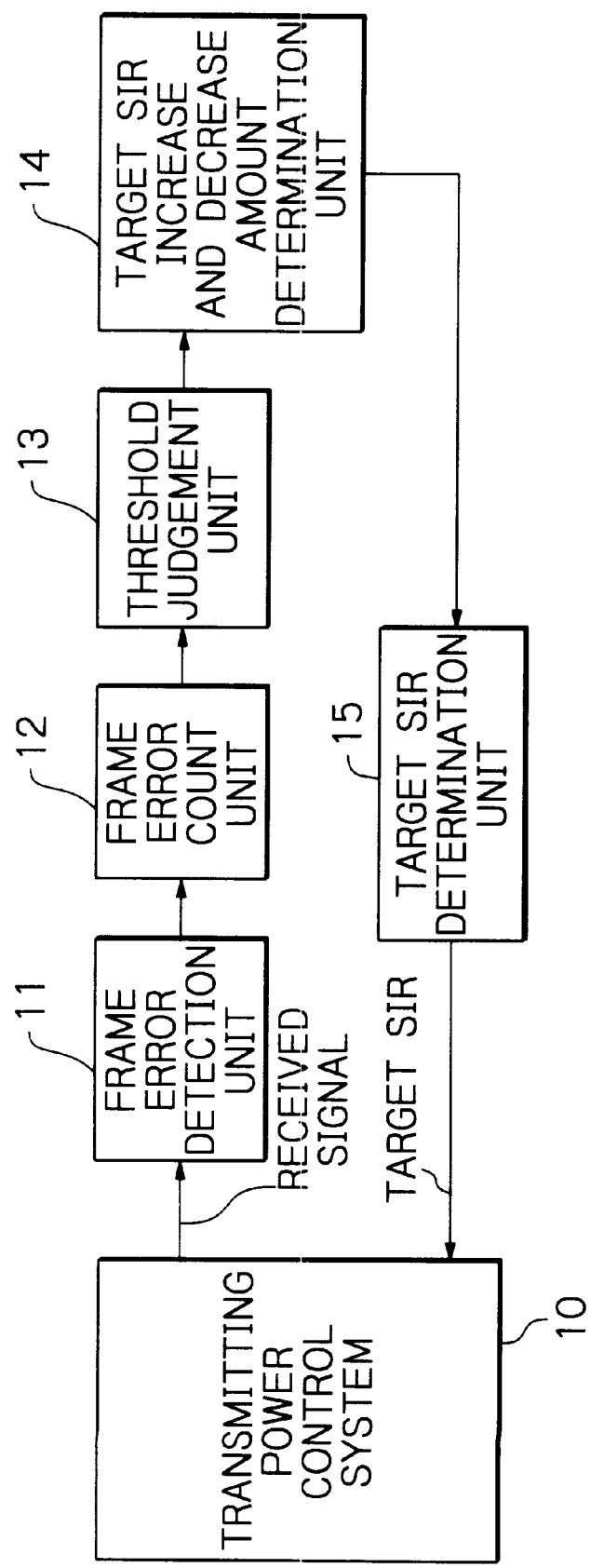
FIG. 1 shows a block diagram schematically illustrating a circuit configuration including a target SIR determination system and a transmitting power control system in a preferred first embodiment according to the present invention.

As shown in FIG. 1, the control method can be achieved by the circuit configuration with a transmitting power control system 10 and a target SIR determination system. The target SIR determination system has a frame error detection unit 11, a frame error count unit 12, a threshold judgement unit 13, a unit for determining the amount of increase and decrease of the target SIR 14, and a unit for determining the target SIR 15.

The transmitting power control system 10 consists of a receiving section 100 located at the receiving side and a transmitting section 105 located in the transmitting side, and controls transmitting power at the transmitting side so that a SIR of a signal transmitted from the section 105 and received by the section 100 becomes equal to a target SIR applied thereto.

Figure 2:
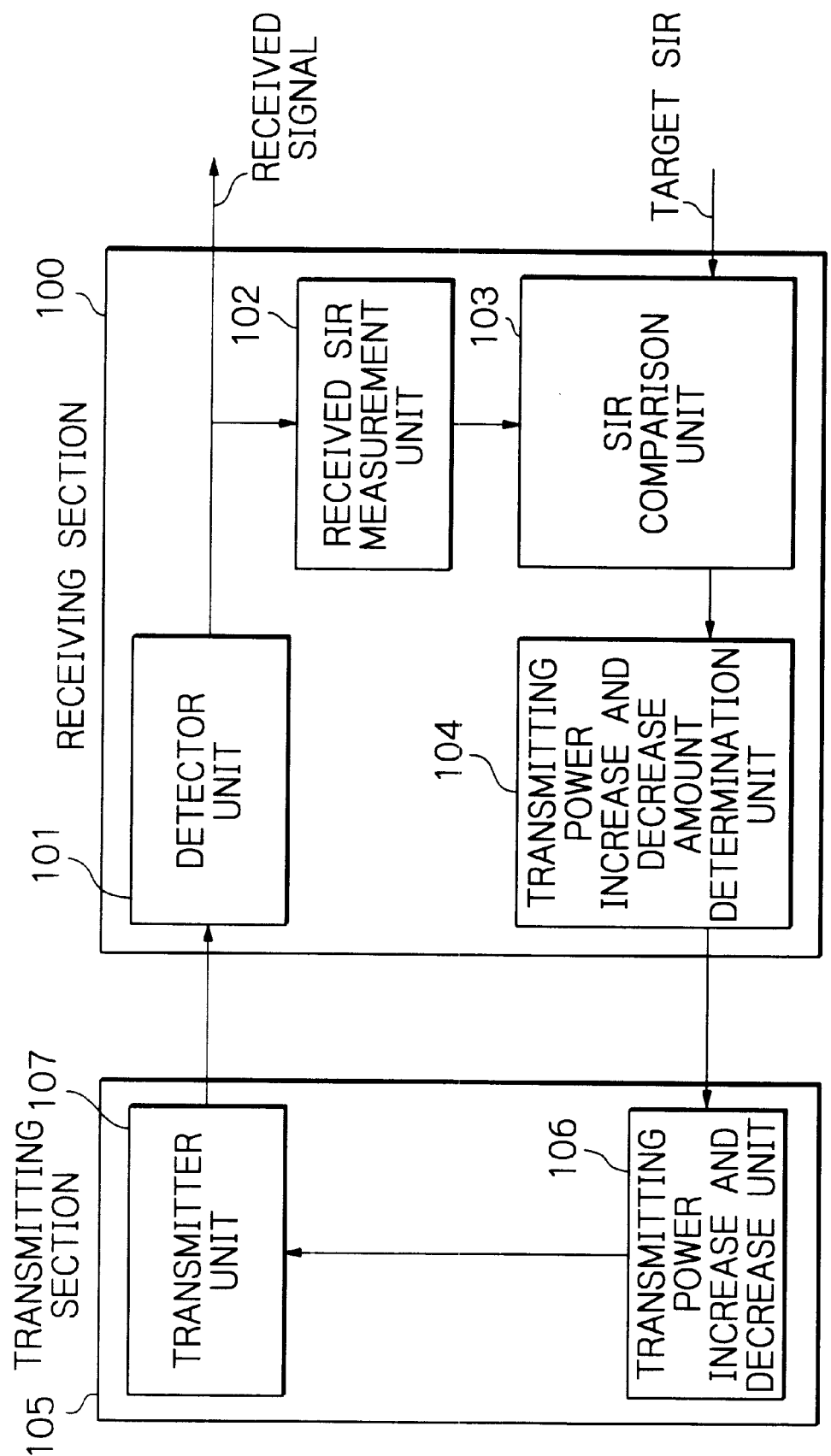
FIG. 2 shows a block diagram schematically illustrating the transmitting power control system shown in FIG. 1.

As shown in FIG. 2, the transmitting power control system 10 has a detector unit 101, a received SIR measurement unit 102, a SIR comparison unit 103 and a unit for determining the amount of increase and decrease of transmitting power 104 in the section 100, and also has a transmitting power increase and decrease unit 106 and a transmitter unit 107 in the section 105.

The detector unit 101 in the section 100 receives the signal sent from the transmitter unit 107 in the section 105. The received signal is outputted from the detector unit 101 to the exterior of the transmitting power control system 10 and also outputted to the received SIR measurement unit 102. At the unit 102, the SIR of the received signal is measured. At the unit 103, the measured received SIR is compared with a target SIR provided from the exterior of the transmitting power control system 10 and the result of this comparison is informed to the determination unit 104. The unit 104 determines the amount of increase and decrease of the transmitting power at the transmitting side based on the comparison result of the SIR such as the difference of the SIRs and higher or lower. The determined increase and decrease amount is informed to the unit 106 in the transmitting section 105. The unit 106 increases or decreases the transmitting power at the transmitter unit 107 depending on the informed increase and decrease amount.

Thus, the transmitting power control system 10 controls the transmitting power at the transmitting side so that the SIR of the signal transmitted from the section 105 and received by the section 100 becomes equal to the target SIR provided thereto from the exterior.

The target SIR determination system shown in FIG. 1 determines and provides a proper target SIR to the transmitting power control system 10. The target SIR determination system in this first embodiment operates as follows.

The frame error detection unit 11 detects possible frame error in the received signal provided from the transmitting power control system 10 for every frame. Thus, the information about whether a frame error is detected or not is inputted into the frame error count unit 12 for every frame. The unit 12 always counts the number of frame errors in N last frames based on the information inputted for every frame, and outputs the counted value every M frames (N and M are positive integers). The threshold judgement unit 13 compares the inputted counted value or the number of frame errors n with predetermined thresholds t1 and t2 ($t1 \geq t2$), and then informs whether it is $n \geq t1$ or not and whether it is $n \leq t2$ or not to the increase and decrease amount determination unit 14 as a comparison result. The unit 14 determines the increase and decrease amount of the SIR to +S1 when it is $n \geq t1$, determines the increase and decrease amount of target SIR to −S2 when it is $n \leq t2$, and determines the increase and decrease amount of the SIR to zero when it is not $n \geq t1$ nor $n \leq t2$. Thus, determined increase and decrease amount of target SIR is informed to the target SIR determination unit 15. The unit 15 keeps a value of the target SIR and outputs the target SIR value to the transmitting power control system 10. When the increase and decrease amount of target SIR is informed from the unit 14, the unit 15 adjusts, namely increases or decreases, the kept value of the target SIR by the informed increase and decrease amount. Then the unit 15 keeps the adjusted value of the target SIR and outputs the adjusted target SIR value to the transmitting power control system 10. Thus, as aforementioned, the system 10 controls the transmitting power using the target SIR value from the unit 15 as a target of the received signal SIR.

The parameters N, M, t1 and t2 can be set to optional values and it is also possible to modify the values during operations.

By setting the increase and decrease values of target SIR S1 and S2 to proper values, it is possible to make a long average FER to be equal to a target FER. Namely, the increase and decrease amount of target SIR S1 and S2 are set to satisfy the following equation;

$$S1 \times P1 = S2 \times P2$$

or $$10^{\wedge}(S1/10) \times P1 + 10^{\wedge}(-S2/10) \times P2 = P1 + P2$$

where P1 is a probability of that relationship of the number of frame errors n with respect to the threshold t1 becomes $n \geq t1$ when the long average FER is equal to the target FER, and P2 is a probability of that relationship of the number of frame errors n with respect to the threshold t2 becomes $n \leq t2$ when the long average FER is equal to the target FER. Thus setting the S1 and S2, the variation of the long target SIR will become zero when the long average FER is equal to the target FER. If it considers conversely, the long average FER will become almost equal to the target FER under the steady state in which the variation of the long target SIR is zero.

In case that there is a difference $\Delta SIR$ between the target SIR and the required SIR which satisfies a target frame error rate, the above-mentioned equation will be represented by $$S1 \times P1 - S2 \times P2 = \Delta SIR$$

or $$10^{\wedge}(S1/10) \times P1 + 10^{\wedge}(-S2/10) \times P2 + (1-P1-P2) = 10^{\wedge}(\Delta SIR/10).$$

According to the aforementioned setting method of the SIR increase and decrease values S1 and S2, since the probabilities P1 and P2 change depending upon the thresholds t1 and t2, the ratio of the values S1 and S2 can be regulated. That is, it can set up to have no extreme difference between the values of S1 and S2, and thus a unnecessary large variation of the target SIR can be prevented from occurring. In case that the number of the measuring frames N is 1/p or less (p is the target FER), the above-mentioned setting method of S1 and S2 can be used to make the long average FER to a value which is almost equal to the target FER. Namely, by making the number of measuring frames N to some extent small, it is possible to respond to rapid change of the required SIR. Therefore, this embodiment can solve the previously mentioned first problem.

Second Embodiment

Figure 3:
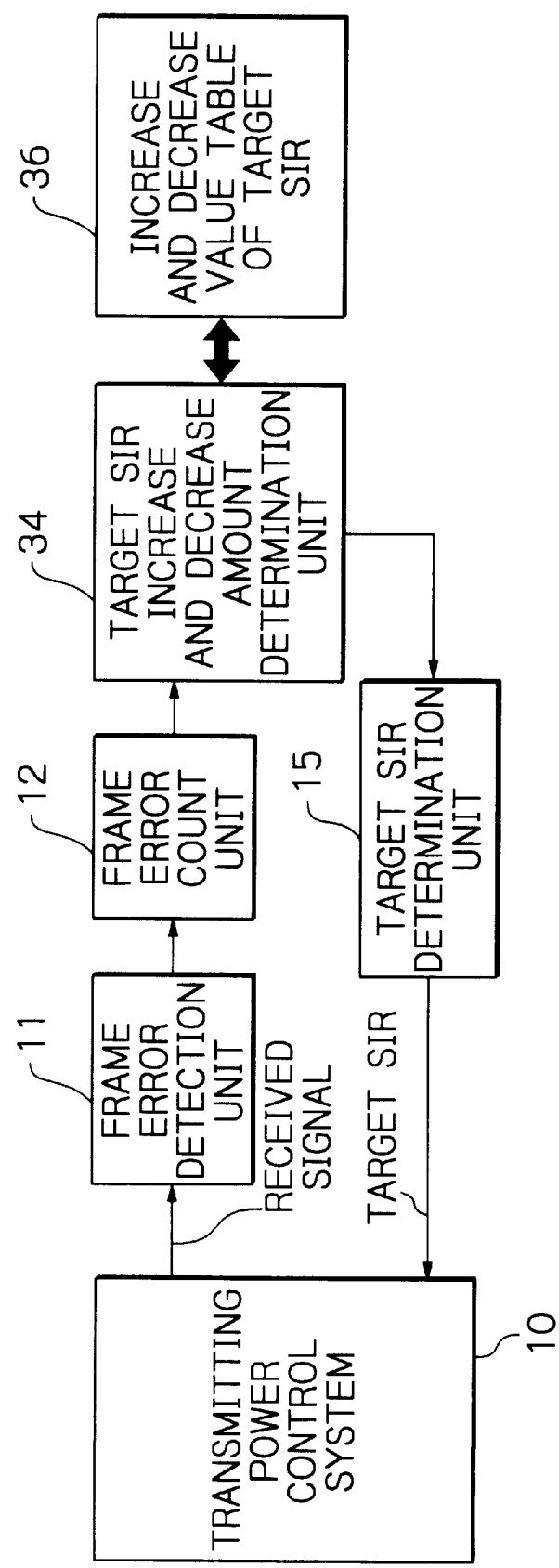
FIG. 3 shows a block diagram schematically illustrating a circuit configuration including a target SIR determination system and a transmitting power control system in a second embodiment according to the present invention.

As shown in FIG. 3, the control method can be also achieved by the circuit configuration with the transmitting power control system 10 and a target SIR determination system. The target SIR determination system has the frame error detection unit 11, the frame error count unit 12, a unit for determining the amount of increase and decrease of the target SIR 34, an increase and decrease value table of target SIR 36 and the unit for determining the target SIR 15.

The configurations and operations of the transmitting power control system 10, the frame error detection unit 11, the frame error count unit 12, and the target SIR determination unit 15 in this embodiment are the same as those with the same references in the first embodiment.

In this second embodiment, the table 36 preliminarily stores the increase and decrease values of target SIR S(i) ($0 \leq i \leq N$) with respect to the number of frame errors n as shown in Table 1. As will be noted from this Table 1, the table 36 stores relationships between n and S(i), for example, S(i) is −0.6 dB when n=1, and S(i) is +1.5 dB when n=3.

TABLE 1

| The number of Frame Errors n | SIR Increase and Decrease Value S(i) |
|---|---|
| 0 | −1.2 dB |
| 1 | −0.6 dB |
| 2 | 0.0 dB |
| 3 | +1.5 dB |
| 4 | +2.0 dB |
| 5 | +2.2 dB |
| 6 or more | +2.4 dB |

The increase and decrease amount determination unit 34 determines the increase and decrease amount of the SIR at each time it recieves the number of frame errors n outputted from the unit 12 for every M frame, by referring the table 36. The determined increase and decrease amount of target SIR is informed to the target SIR determination unit 15. When the increase and decrease amount of target SIR is informed from the unit 14, the unit 15 increases or decreases the value of the target SIR by the informed increase and decrease amount. Then the unit 15 keeps the adjusted value of the target SIR and outputs the adjusted target SIR value to the transmitting power control system 10. Thus, as aforementioned, the system 10 controls the transmitting power using the target SIR value from the unit 15 as a target of the received signal SIR.

In this embodiment, the parameters N and M can be set to optional values and it is also possible to modify the values during operations.

By setting the increase and decrease value of target SIR S(i) ($0 \leq i \leq N$) in the table 36 as follows, it is possible to make a long FER to be equal to a target FER. Namely, the increase and decrease amount of target SIR S(i) is set to satisfy the following equation;

$$\sum_{i=0}^{N} S(i)P(i) = 0 \text{ or } \sum_{i=0}^{N} 10^{\wedge}(S(i)/10) \times P(i) = 1$$

where P(i) is a probability of that the number of frame errors n becomes equal to i ($0 \leq i \leq N$) when the FER is equal to the target FER.

In case that there is a difference $\Delta$SIR between the target SIR and the required SIR which satisfies a target frame error rate, the above-mentioned equation will be represented by $$\sum_{i=0}^{N} S(i) \times P(i) = \Delta SIR \text{ or}$$

$$\sum_{i=0}^{N} 10^{\wedge}(S(i)/10) \times P(i) = 10^{\wedge}(\Delta SIR/10).$$

The increase and decrease amount of target SIR S(i) ($0 \leq i \leq N$) can flexibly set to optional values. By setting the S(i) properly, unnecessary large variation of the target SIR can be prevented from occurring. As well as executed in the first embodiment, by making the number of measuring frames N to some extent small, it is possible to respond to rapid change of the required SIR in this second embodiment. Therefore, this embodiment also can solve the previously mentioned first problem.

In the aforementioned first and second embodiments, if N is equal to M, process can be simplified because it is only required that the frame error count unit 12 counts and outputs the number of frame errors for every N frame.

Also, in the aforementioned first and second embodiments, it is possible to prevent excess control of the target SIR by stopping the increasing and decreasing of the target SIR during N frames just after the target SIR is once adjusted. This is because, during this N frame period just after the target SIR is once adjusted, some frame errors produced before the target SIR is adjusted may be included in the counted frame errors.

Third Embodiment

Figure 4:
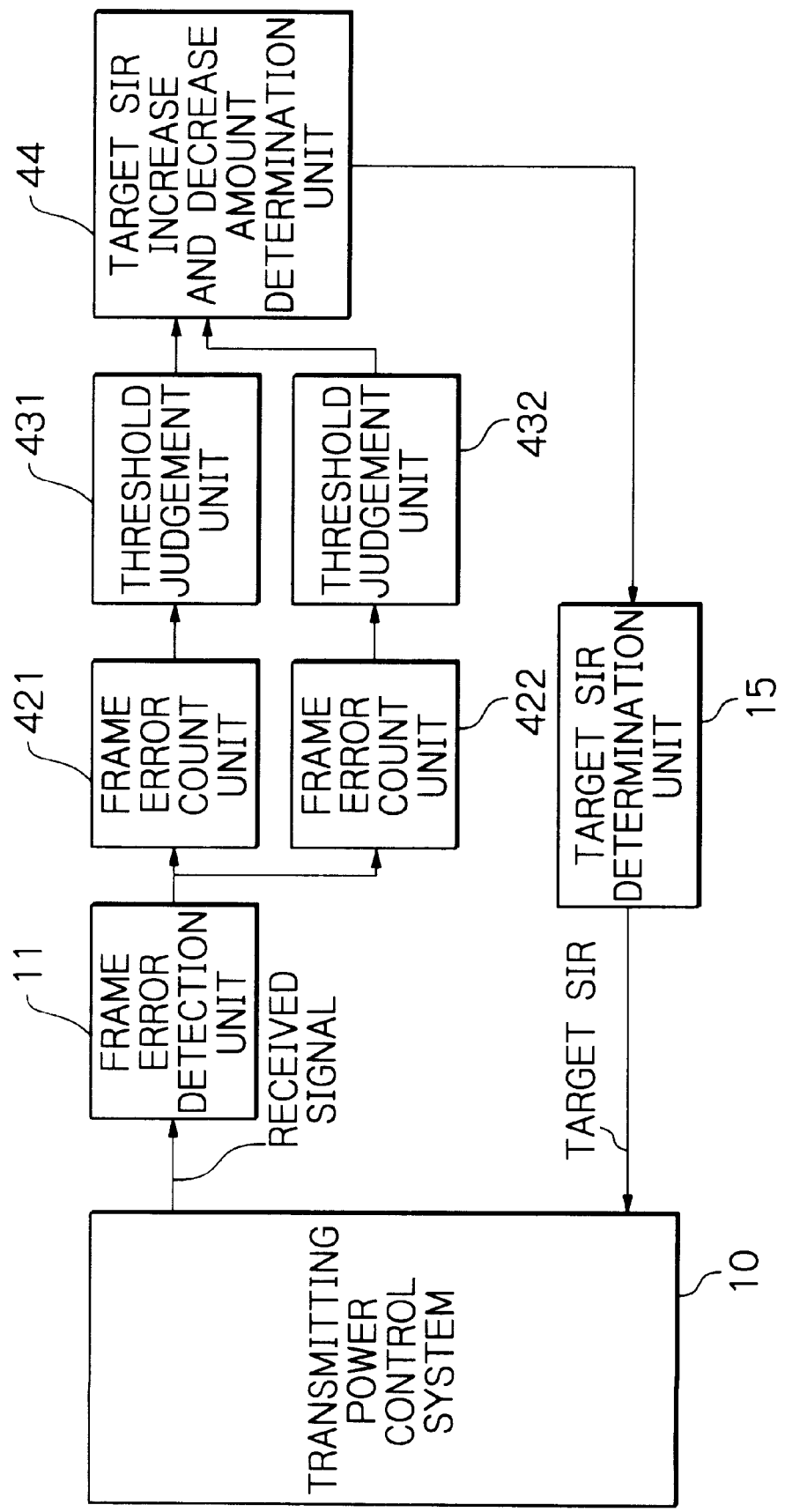
FIG. 4 shows a block diagram schematically illustrating a circuit configuration including a target SIR determination system and a transmitting power control system in a third embodiment according to the present invention.

As shown in FIG. 4, the control method can be achieved by the circuit configuration with the transmitting power control system 10 and a target SIR determination system. The target SIR determination system has the frame error detection unit 11, first and second frame error count units 421 and 422, first and second threshold judgement units unit 431 and 432, a unit for determining the amount of increase and decrease of the target SIR 44 and the unit for determining the target SIR 15.

The configurations and operations of the transmitting power control system 10, the frame error detection unit 11 and the target SIR determination unit 15 in this embodiment are the same as those with the same references in the first embodiment.

In this third embodiment, the first and second frame error count units 421 and 422 operate individually. The first frame error count unit 421 always counts the number of frame errors in N1 last frames and outputs the counted value every M1 frames, whereas the second frame error count unit 422 always counts the number of frame errors in N2 last frames and outputs the counted value every M2 frames (N1, M1, N2 and M2 are positive integers and N2≠N1). The first threshold judgement unit 431 compares the inputted counted value or the number of frame errors n1 from the first frame error count unit 421 with a predetermined threshold t1, and then informs whether it is n1≧t1 or not to the increase and decrease amount determination unit 44 as a comparison result. Whereas the second threshold judgement unit 432 compares the inputted counted value or the number of frame errors n2 from the second frame error count unit 422 with a predetermined threshold t2, and then informs whether it is n2≦t2 or not to the increase and decrease amount determination unit 44 as a comparison result.

The unit 44 determines the increase and decrease amount of the SIR to +S1 when it is n1≧t1, and determines the increase and decrease amount of target SIR to −S2 when it is n2≦t2. The determined increase and decrease amount is then outputted to the target SIR determination unit 15. The unit 44 also determines the increase and decrease amount of the SIR to zero and outputs the determined amount when it is not n1≧t1 nor n2≦t2. In the latter case, the unit 44 may not output the determined increase and decrease amount. When the increase and decrease amount of target SIR is informed from the unit 44, the unit 15 increases or decreases the value of the target SIR by the informed increase and decrease amount. Then the unit 15 keeps the adjusted value of the target SIR and outputs the adjusted target SIR value to the transmitting power control system 10. Thus, as aforementioned, the system 10 controls the transmitting power using the target SIR value from the unit 15 as a target of the received signal SIR.

In this embodiment, also, the parameters N1, M1, N2, M2, t1 and t2 can be set to optional values and it is possible to modify the values during operations.

As well as done in the first embodiment, by setting the increase and decrease values of target SIR S1 and S2 to proper values, it is possible to make a long average FER to be equal to a target FER. Namely, the increase and decrease amount of target SIR S1 and S2 are set to satisfy the following equation;

$$S1 \times P1 = S2 \times P2$$

or $$10^{(S1/10)} \times P1 + 10^{(-S2/10)} \times P2 = P1 + P2$$

where P1 is a probability of that relationship of the number of frame errors n1 with respect to the threshold t1 becomes n1≧t1 when the long average FER is equal to the target FER, and P2 is a probability of that relationship of the number of frame errors n2 with respect to the threshold t2 becomes n2≦t2 when the long average FER is equal to the target FER. Thus, this embodiment also can solve the previously mentioned first problem as well as the first embodiment.

In case that there is a difference ΔSIR between the target SIR and the required SIR which satisfies a target frame error rate, the above-mentioned equation will be represented by $$S1 \times P1 - S2 \times P2 = \Delta SIR$$

or $$10^{(S1/10)} \times P1 + 10^{(-S2/10)} \times P2 + (1 - P1 - P2) = 10^{(\Delta SIR/10)}.$$

In the third embodiment, it is possible to prevent excess control of the target SIR by stopping the increasing and decreasing of the target SIR during N1 frames just after the target SIR is increased and during N2 frames just after the target SIR is decreased. This is because, during this N1 or N2 frame period just after the target SIR is once adjusted, some frame errors produced before the target SIR is adjusted may be included in the counted frame errors.

Fourth Embodiment

Figure 5:
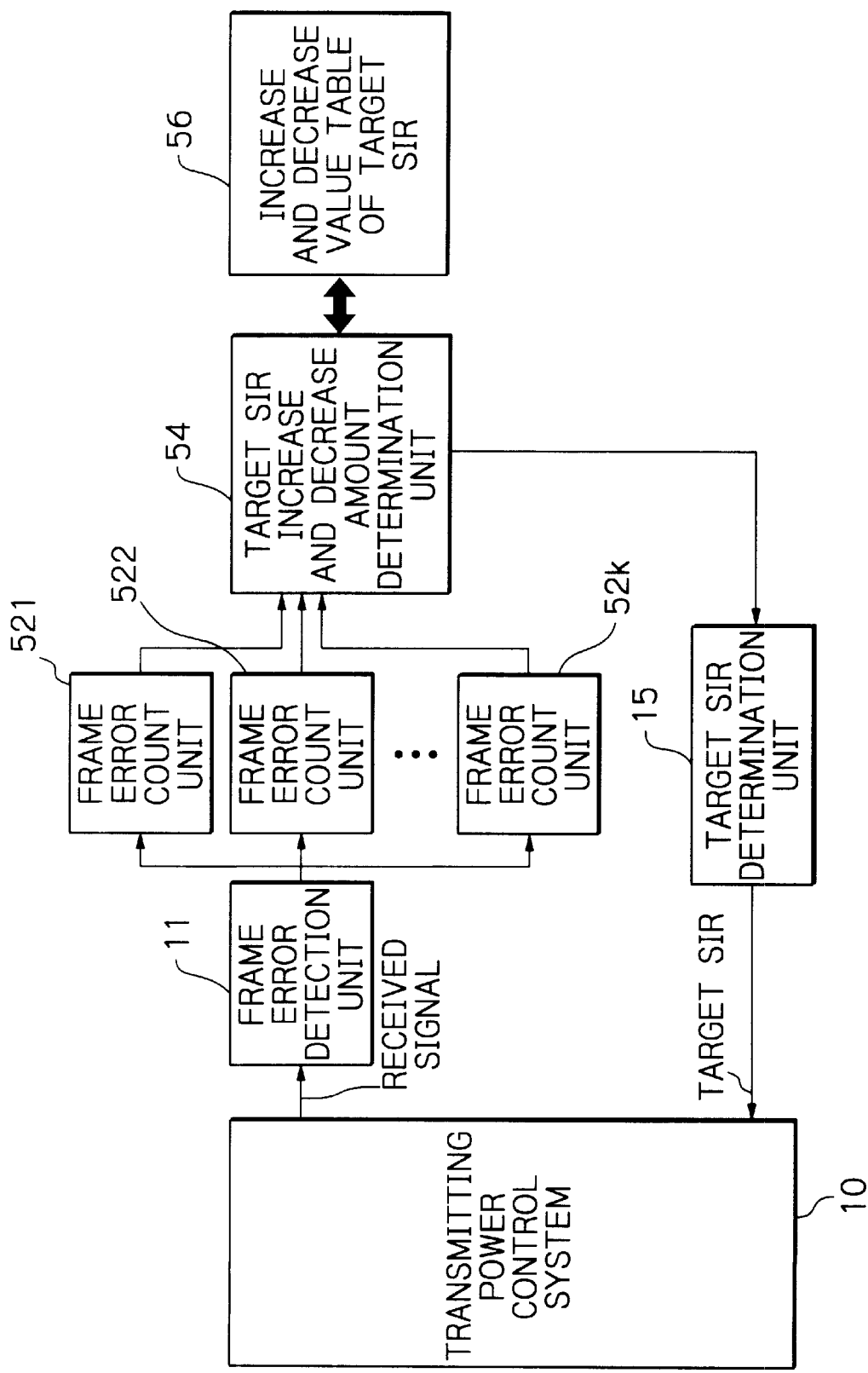
FIG. 5 shows a block diagram schematically illustrating a circuit configuration including a target SIR determination system and a transmitting power control system in a fourth embodiment according to the present invention.

As shown in FIG. 5, the control method can be also achieved by the circuit configuration with the transmitting power control system 10 and a target SIR determination system. The target SIR determination system has the frame error detection unit 11, first, second, . . . , K-th frame error count units 521, 522, . . . , 52K, a unit for determining the amount of increase and decrease of the target SIR 54, an increase and decrease value table of target SIR 56 and the unit for determining the target SIR 15.

The configurations and operations of the transmitting power control system 10, the frame error detection unit 11, and the target SIR determination unit 15 in this embodiment are the same as those with the same references in the first embodiment.

In this fourth embodiment, the first, second, . . . , K-th frame error count units 521, 522, . . . , and 52K operate individually. The k-th frame error count unit 52k (1≦k≦K) always counts the number of frame errors in N(k) last frames and outputs the counted value n(k) every M(k) frames (N(k) and M(k) are positive integers).

The table 56 preliminarily stores the increase and decrease values of target SIR with respect to a set of the numbers of frame errors n(1), n(2), . . . , n(k) (1≦k≦K) as shown in Table 2. As will be noted from this Table 2, the table 56 stores relationships between the numbers of frame errors and the increase and decrease values of target SIR when K=4. For example, the increase and decrease value of target SIR is −0.8 dB when n(1)=0, n(2)=0, n(3)=1 and n(4)=1, and +0.3 dB when n(1)=1, n(2)=1, n(3)=1 and n(4)=1.

TABLE 2

| The Number of Frame Errors | | | | SIR Increase and Decrease |
|---|---|---|---|---|
| n(1) | n(2) | n(3) | n(4) | Value |
| 0 | 0 | 0 | 0 | −1.2 dB |
| 0 | 0 | 0 | 1 | −1.0 dB |
| 0 | 0 | 1 | 1 | −0.8 dB |
| 0 | 1 | 1 | 1 | 0.0 dB |
| 1 | 1 | 1 | 1 | +0.3 dB |
| 0 | 0 | 0 | 2 | −0.5 dB |
| 0 | 0 | 1 | 2 | −0.2 dB |
| 0 | 0 | 2 | 2 | 0.0 dB |
| 0 | 1 | 1 | 2 | +0.2 dB |
| 0 | 1 | 2 | 2 | +0.4 dB |
| 0 | 2 | 2 | 2 | +0.6 dB |
| 1 | 1 | 1 | 2 | +0.9 dB |
| . | . | . | . | . |
| . | . | . | . | . |
| 3 or more | 3 or more | 4 or more | 4 or more | +3.0 dB |

The increase and decrease amount determination unit 54 determines the increase and decrease amount of the SIR corresponding to newest set of the numbers of frame errors n(1), . . . , n(K) outputted from the units 521, 522, . . . , and 52K at each time it receives one of the numbers of frame errors n(1), n(2), . . . , n(K), by referring the table 56. The determined increase and decrease amount of target SIR is informed to the target SIR determination unit 15. When the increase and decrease amount of target SIR is informed from the unit 54, the unit 15 increases or decreases the value of the target SIR by the informed increase and decrease amount. Then the unit 15 keeps the adjusted value of the target SIR and outputs the adjusted target SIR value to the transmitting power control system 10. Thus, as aforementioned, the system 10 controls the transmitting power using the target SIR value from the unit 15 as a target of the received signal SIR.

In this embodiment, the parameters N(k) and M(k) (1≦k≦K) can be set to optional values and it is also possible to modify the values during operations.

By setting the increase and decrease values of target SIR with respect to the numbers of frame errors stored in the table 56 as follows, it is possible to make a long average FER to be equal to a target FER. Namely, the increase and decrease amount of target SIR S(i(1), i(2), . . . , i(K)) (0≦i(k)≦N(k), 1≦k≦K) is set to satisfy the following equation;

$$\sum_{i(1)=0}^{N(1)} \sum_{i(2)=0}^{N(2)} \ldots \sum_{i(K)=0}^{N(K)} S(i(1), i(2), \ldots , i(K)) P(i(1), i(2), \ldots , i(K)) = 0$$

or $$\sum_{i(1)=0}^{N(1)} \sum_{i(2)=0}^{N(2)} \ldots \sum_{i(K)=0}^{N(K)} 10 \wedge (S(i(1), i(2), \ldots , i(K))/10) \times$$

$$P(i(1), i(2), \ldots , i(K)) = 1$$

where S(i(1), i(2), . . . , i(K)) (0≦i(k)≦N(k), 1≦k≦K) is an increase and decrease amount of target SIR when the set of the numbers of frame errors (n(1), n(2), . . . , n(K)) is equal to (i(1), i(2), . . . , i(K)) and when increasing and decreasing are indicated by positive and negative polarities, respectively, P(i(1), i(2), . . . , i(K)) is a probability of that set of the numbers of frame errors (n(1), n(2), . . . , n(K)) becomes equal to (i(1), i(2), . . . , i(K)) when the FER is equal to the target FER.

In case that there is a difference ΔSIR between the target SIR and the required SIR which satisfies a target frame error rate, the above-mentioned equation will be represented by $$\sum_{i(1)=0}^{N(1)} \sum_{i(2)=0}^{N(2)} \ldots \sum_{i(K)=0}^{N(K)} S(i(1), i(2), \ldots , i(K)) \times P(i(1), i(2), \ldots , i(K)) = \Delta SIR$$

or $$\sum_{i(1)=0}^{N(1)} \sum_{i(2)=0}^{N(2)} \ldots \sum_{i(K)=0}^{N(K)} 10 \wedge (S(i(1), i(2), \ldots , i(K))/10) \times P(i(1), i(2), \ldots , i(K)) =$$

$$10 \wedge (\Delta SIR/10).$$

The increase and decrease value table of target SIR 56 may be a table for storing a target SIR increase and decrease value for each of the number of frame errors n(1), n(2), . . . , n(K) as shown in Table 3. As will be noted from this Table 3, the table 56 may store relationships between the numbers of frame errors and the respective increase and decrease values of target SIR when K=4. For example, the increase and decrease value of target SIR is +0.7 dB when n(3)=2, and −0.2 dB when n(1)=1.

TABLE 3

| The Number of Frame Errors | Increase and Decrease Amount of Target SIR |
|---|---|
| n(1) = 0 | −0.5 dB |
| n(1) = 1 | −0.2 dB |
| n(1) = 2 | 0.0 dB |
| n(1) = 3 | +0.3 dB |
| n(1) = 4 | +0.5 dB |
| n(1) = 5 | +0.7 dB |
| n(1) ≧ 6 | +0.9 dB |
| n(2) = 0 | −0.3 dB |
| n(2) = 1 | 0.0 dB |
| n(2) = 2 | +0.5 dB |
| n(2) = 3 | +1.0 dB |
| n(2) ≧ 4 | +1.5 dB |
| n(3) = 0 | −0.2 dB |
| n(3) = 1 | +0.2 dB |
| n(3) = 2 | +0.7 dB |
| n(3) = 3 | +1.2 dB |
| n(3) = 4 | +1.5 dB |
| n(3) ≧ 5 | +2.0 dB |
| n(4) = 0 | 0.0 dB |
| n(4) = 1 | +0.5 dB |
| n(4) = 2 | +1.0 dB |
| n(4) = 3 | +1.5 dB |
| n(4) ≧ 4 | +2.0 dB |

The increase and decrease amount determination unit 54 determines the increase and decrease amount of the SIR at each time it receives one of the numbers of frame errors n(1), n(2), . . . , n(K) outputted from the units 521, 522, . . . , and 52K, by referring the table 56. The determined increase and decrease amount of target SIR is informed to the target SIR determination unit 15. When the increase and decrease amount of target SIR is informed from the unit 54, the unit 15 increases or decreases the value of the target SIR by the informed increase and decrease amount. Then the unit 15 keeps the adjusted value of the target SIR and outputs the adjusted target SIR value to the transmitting power control system 10. Thus, as aforementioned, the system 10 controls the transmitting power using the target SIR value from the unit 15 as a target of the received signal SIR.

In this case, by setting the increase and decrease amount of target SIR with respect to the number of frame errors stored in the table 56 as follows, it is possible to make a long average FER to be equal to a target FER. Namely, the increase and decrease amount of target SIR S(k, i(k)) (0≦i(k)≦N(k), 1≦k≦K) is set to satisfy the following equation;

$$\sum_{k=1}^{K} \sum_{i(k)=0}^{N(k)} \frac{1}{M(k)} S(k, i(k)) \times P(k, i(k)) = 0 \text{ or}$$

$$\sum_{k=0}^{K} \sum_{i(k)=0}^{N(k)} \frac{1}{M(k)} 10 \wedge S(k, i(k))/10) \times P(k, i(k)) = 1$$

where S(k, i(K)) (0≦i(k)≦N(k), 1≦k≦K) is an increase and decrease amount of target SIR when the number of frame errors n(k) is equal to i(k) and when increasing and decreasing are indicated by positive and negative polarities, respectively, P(k, i(k)) is a probability, for a certain integer k (1≦k≦K), of that the number of frame errors during N(k) frames n(k) becomes equal to i(k) (0≦i(k)≦N(k)) when the FER is equal to the target FER.

In case that there is a difference ΔSIR between the target SIR and the required SIR which satisfies a target frame error rate, the above-mentioned equation will be represented by $$\sum_{k=0}^{K}\sum_{i(k)=0}^{N(k)}\frac{1}{M(k)}S(k, i(k))\times P(k, i(k)) = \Delta SIR \text{ or}$$

$$\sum_{k=0}^{K}\sum_{i(k)=0}^{N(k)}\frac{1}{M(k)}10\wedge S(k, i(k))/10)\times P(k, i(k)) = 10\wedge(\Delta SIR/10).$$

Since the increase and decrease amount of target SIR S(i(1), i(2), ..., i(K)) (0≦i(k)≦N(k), 1≦k≦K) can flexibly set to an optional value, this embodiment can obtain the similar advantages as that in the second embodiment and also can solve the previously mentioned first problem.

Fifth Embodiment

Figure 6:
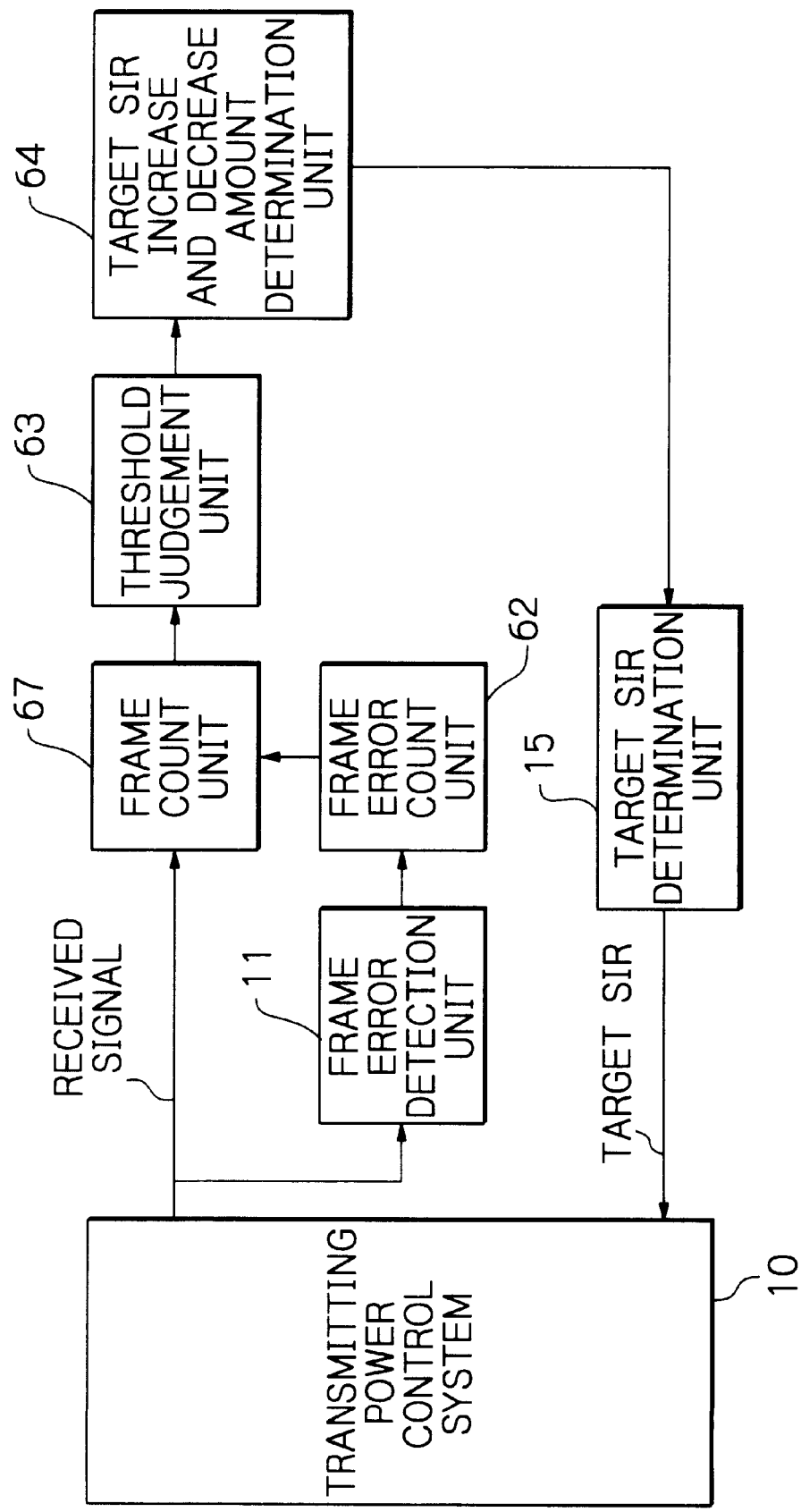
FIG. 6 shows a block diagram schematically illustrating a circuit configuration including a target SIR determination system and a transmitting power control system in a fifth embodiment according to the present invention.

As shown in FIG. 6, the control method can be also achieved by the circuit configuration with the transmitting power control system 10 and a target SIR determination system. The target SIR determination system has the frame error detection unit 11, a frame error count unit 62, a frame count unit 67, a threshold judgement unit 63, a unit for determining the amount of increase and decrease of the target SIR 64 and the unit for determining the target SIR 15.

The configurations and operations of the transmitting power control system 10, the frame error detection unit 11 and the target SIR determination unit 15 in this embodiment are the same as those with the same references in the first embodiment.

In this fifth embodiment, the frame error count unit 62 counts the number of frame errors detected by the frame error detection unit 11. If the counted value reaches a predetermined value m, the unit 62 informs it to the frame count unit 67 and resets its counted value to zero. The frame count unit 67 counts the number of frames. When it is informed that the counted number of frame errors reaches m, the unit 67 outputs its counted number of frames to the threshold judgement unit 63 and resets its counted value to zero. The threshold judgement unit 63 compares the inputted counted value or the counted number of frames C with predetermined thresholds t1 and t2 (t1≦t2), and then informs whether it is C≦t1 or not and whether it is C≧t2 or not to the increase and decrease amount determination unit 64 as a comparison result. The unit 64 determines the increase and decrease amount of the SIR to +S1 when it is C≦t1, determines the increase and decrease amount of target SIR to −S2 when it is C≧t2, and determines the increase and decrease amount of the SIR to zero when it is not C≦t1 nor C≧t2. Thus, determined increase and decrease amount of target SIR is informed to the target SIR determination unit 15. When the increase and decrease amount of target SIR is informed from the unit 64, the unit 15 increases or decreases the value of the target SIR by the informed increase and decrease amount. Then the unit 15 keeps the adjusted value of the target SIR and outputs the adjusted target SIR value to the transmitting power control system 10. Thus, as aforementioned, the system 10 controls the transmitting power using the target SIR value from the unit 15 as a target of the received signal SIR.

The parameters m, t1 and t2 can be set to optional values and it is also possible to modify the values during operations.

By setting the increase and decrease values of target SIR S1 and S2 to proper values, it is possible to make a long average FER to be equal to a target FER. Namely, the increase and decrease values of target SIR S1 and S2 are set to satisfy the following equation;

$$S1\times P1 = S2\times P2$$

or $$10^{\hat{}}(S1/10)\times P1 + 10^{\hat{}}(-S2/10)\times P2 = P1 + P2$$

where P1 is a probability of that relationship of the number of frames C during which frame errors were occurred m times with respect to the threshold t1 becomes C≦t1 when the long average FER is equal to the target FER, and P2 is a probability of that relationship of the number of frames C during which frame errors were occurred m times with respect to the threshold t2 becomes C≧t2 when the long average FER is equal to the target FER.

In case that there is a difference ΔSIR between the target SIR and the required SIR which satisfies a target frame error rate, the above-mentioned equation will be represented by $$S1\times P1 - S2\times P2 = \Delta SIR$$

or $$10^{\hat{}}(S1/10)\times P1 + 10^{\hat{}}(-S2/10)\times P2 + (1-P1-P2) = 10^{\hat{}}(\Delta SIR/10).$$

According to the aforementioned setting method of the SIR increase and decrease values S1 and S2, since the probabilities P1 and P2 change depending upon the thresholds t1 and t2, the ratio of the values S1 and S2 can be regulated. That is, it can set up to have no extreme difference between the values of S1 and S2, and thus a unnecessary large variation of the target SIR can be prevented from occurring. If the set value for the number of frame errors m is reduced, actual measuring time for the number of frames C becomes short. Thus, by making the value m to some extent small, it is possible to respond to rapid change of the required SIR. Therefore, this embodiment can solve the previously mentioned first problem.

Sixth Embodiment

Figure 7:
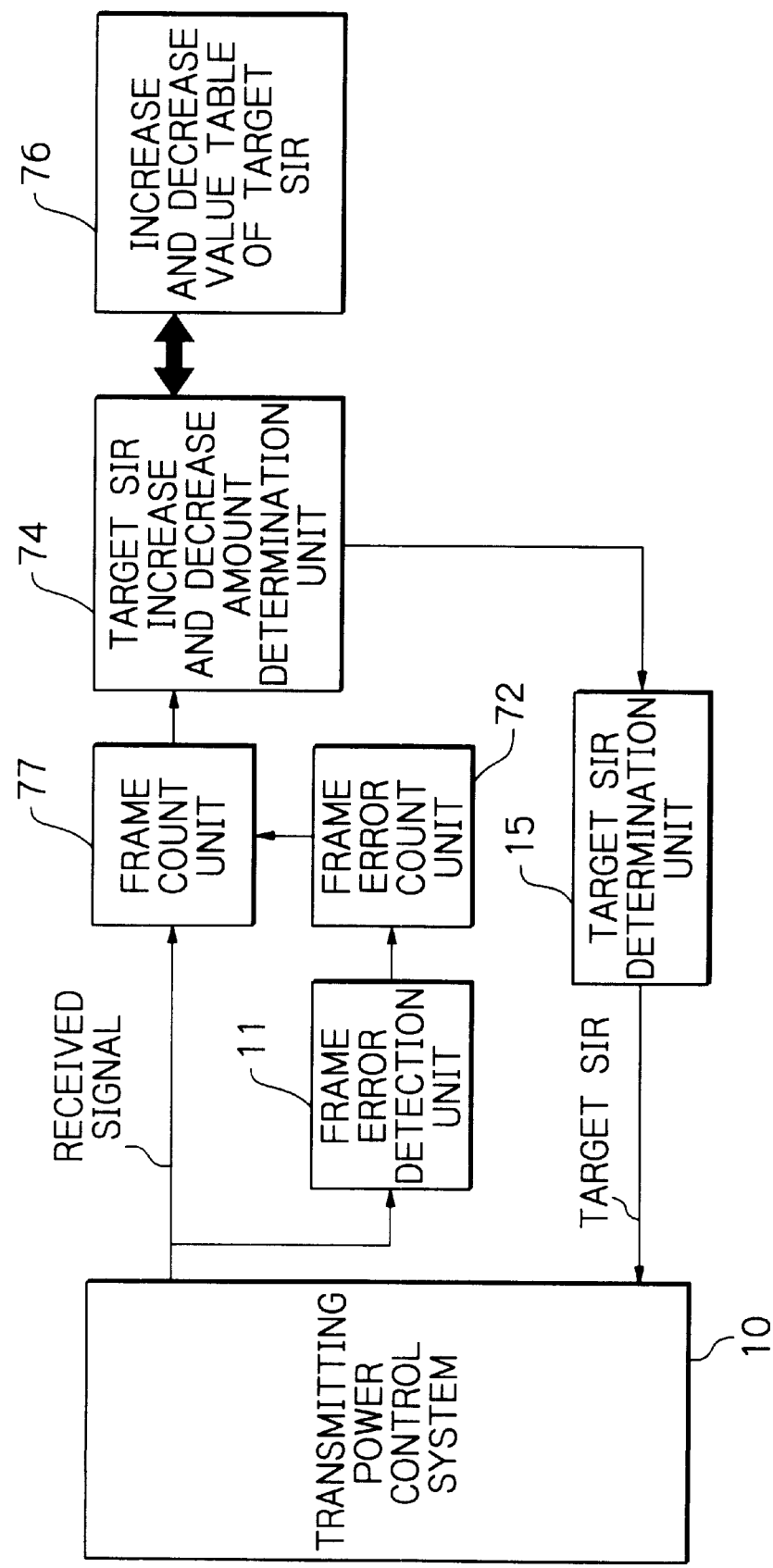
FIG. 7 shows a block diagram schematically illustrating a circuit configuration including a target SIR determination system and a transmitting power control system in a sixth embodiment according to the present invention.

As shown in FIG. 7, the control method can be also achieved by the circuit configuration with the transmitting power control system 10 and a target SIR determination system. The target SIR determination system has the frame error detection unit 11, a frame error count unit 72, a frame count unit 77, a unit for determining the amount of increase and decrease of the target SIR 74, an increase and decrease value table of target SIR 76 and the unit for determining the target SIR 15.

The configurations and operations of the transmitting power control system 10, the frame error detection unit 11 and the target SIR determination unit 15 in this embodiment are the same as those with the same references in the first embodiment.

In this fifth embodiment, the frame error count unit 72 counts the number of frame errors detected by the frame error detection unit 11. If the counted value reaches a predetermined value m, the unit 72 informs it to the frame count unit 77 and resets its counted value to zero. The frame count unit 77 counts the number of frames. When it is informed that the counted number of frame errors reaches m, the unit 77 outputs its counted number of frames to the increase and decrease amount determination unit 74 and resets its counted value to zero.

In this sixth embodiment, the table 76 preliminarily stores the increase and decrease values of target SIR with respect to the number of frames C as shown in Table 4.

As will be noted from this Table 4, the table 76 stores relationships between the number of frames C and the increase and decrease values of target SIR S(i) when C is i (m≦i), for example, S(i) is +0.3 dB when C=50, and S(i) is 0 dB when C=200.

TABLE 4

| The Number of Frames C | Increase and Decrease Amount of Target SIR |
|---|---|
| 10 or less | +1.5 dB |
| 11 to 20 | +1.0 dB |
| 21 to 40 | +0.5 dB |
| 41 to 100 | +0.3 dB |
| 101 to 250 | 0.0 dB |
| 251 to 800 | −0.3 dB |
| 801 or more | −0.5 dB |

The increase and decrease amount determination unit 74 determines the increase and decrease amount of the SIR at each time it receives the number of frames from the frame count unit 77, by referring the table 76. The determined increase and decrease amount of target SIR is informed to the target SIR determination unit 15. When the increase and decrease amount of target SIR is informed from the unit 74, the unit 15 increases or decreases the value of the target SIR by the informed increase and decrease amount. Then the unit 15 keeps the adjusted value of the target SIR and outputs the adjusted target SIR value to the transmitting power control system 10. Thus, as aforementioned, the system 10 controls the transmitting power using the target SIR value from the unit 15 as a target of the received signal SIR.

The parameter m can be set to optional values and it is also possible to modify the value during operations.

By setting the increase and decrease values of target SIR S(i) (m≦i) stored in the table 76 to a proper value, it is possible to make a long FER to be equal to a target FER. Namely, the increase and decrease amount of target SIR S(i) (m≦i) is set to satisfy the following equation;

$$\sum_{i=m}^{\infty} S(i)P(i) = 0$$

where P(i) is a probability of that the number of frames C during which frame errors were occurred m times becomes i (m≦i) when the FER is equal to the target FER. Since the increase and decrease amount of target SIR S(i) (m≦i) can flexibly set to an optional value, a unnecessary large variation of the target SIR can be prevented from occurring. As well as the fifth embodiment, if the set value for the number of frame errors m is reduced, actual measuring time for the number of frames C becomes short. Thus, by making the value m to some extent small, it is possible to respond to rapid change of the required SIR. Therefore, this embodiment can solve the previously mentioned first problem.

Seventh Embodiment

Figure 8:
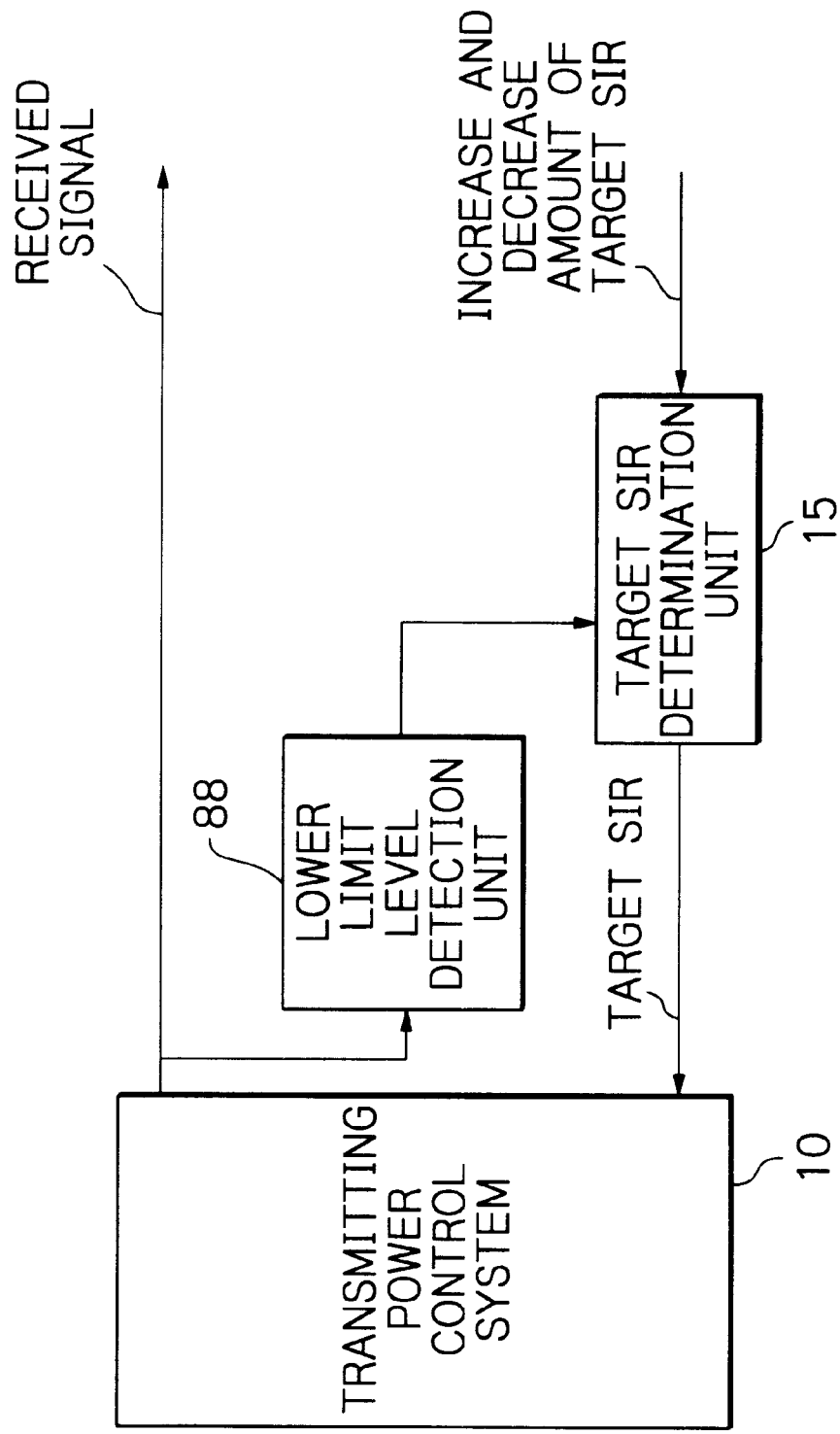
FIG. 8 shows a block diagram schematically illustrating a circuit configuration including a target SIR determination system and a transmitting power control system in a seventh embodiment according to the present invention.

As shown in FIG. 8, the control method can be also achieved by the circuit configuration with the transmitting power control system 10 and a target SIR determination system. The target SIR determination system has a lower detection level detection unit 88, the unit for determining the target SIR 15 and unshown units which determine an increase and decrease amount of target SIR based on a received signal from the transmitting power control system 10. The unshown units may be formed by the similar units in one of the aforementioned first to sixth embodiments.

The configurations and operations of the transmitting power control system 10 and the target SIR determination unit 15 in this embodiment are the same as those with the same references in the first embodiment.

The lower limit level detection unit 88 detects whether the transmitting power at the transmitting side is the minimum level within a permitted range or not, namely the lower limit level or not, and directs not to increase nor decrease the target SIR when detecting that it is the minimum level to the target SIR determination unit 15. The unit 15 does not change the value of the target SIR currently held even if the target SIR increase and decrease amount is inputted, when having received the above-mentioned directive not to increase nor decrease the target SIR from the unit 88.

The detection of whether the transmitting power at the transmitting side is the lower limit level or not can be achieved by containing information which indicates that the transmitting power is the lower limit in a signal to be transmitted at the transmitting side, and by detecting this information from the received signal at the unit 88. The lower limit detection can be also achieved by monitoring the SIR of the received signal and judging that the transmitting power at the transmitting side is the lower limit level when the received signal SIR is kept higher than the target SIR for a predetermined time or more.

According to this seventh embodiment, since the target SIR is not adjusted when the transmitting power is its lower limit level, the previously mentioned second problem can be effectively solved.

Eighth Embodiment

In the aforementioned first to seventh embodiments, the transmitting power control system 10 controls so that the received signal SIR becomes equal to the target SIR. The method of the present invention can use a transmitting power control system for controlling so that a power of the received signal S becomes equal to a target signal power.

Figure 9:
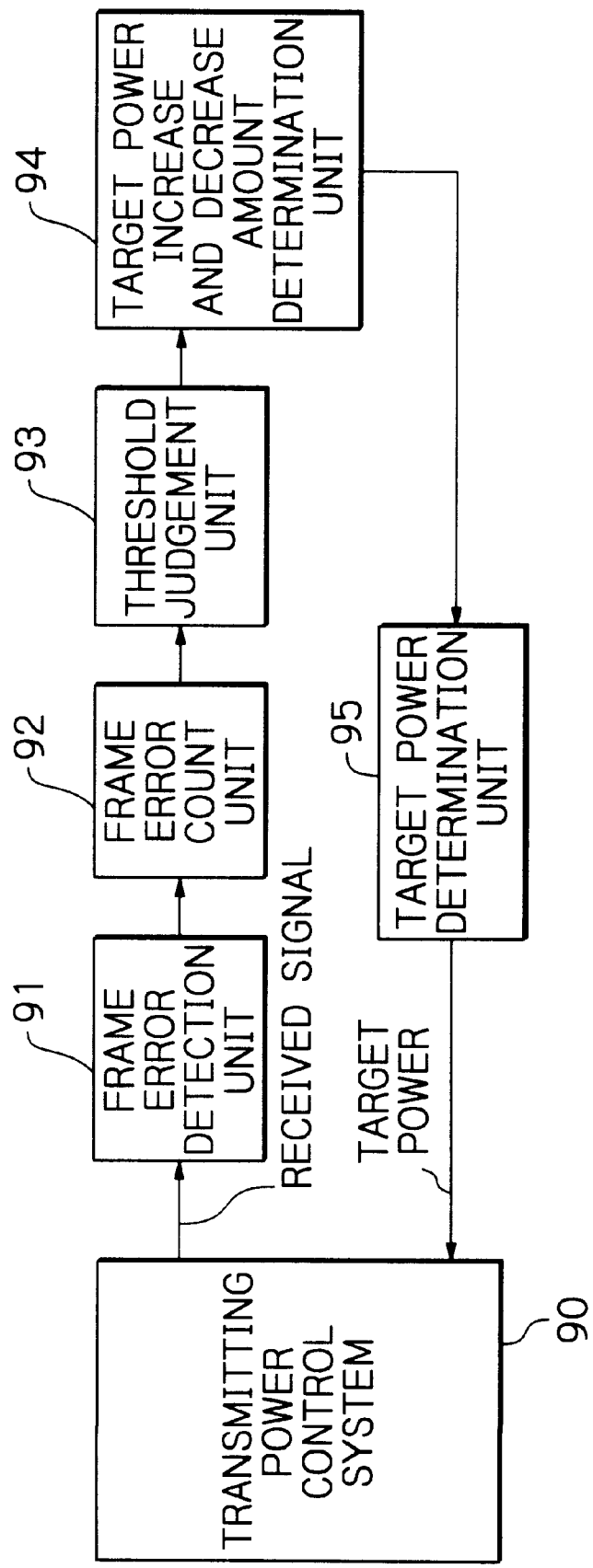
FIG. 9 shows a block diagram schematically illustrating a circuit configuration including a power determination system and a transmitting power control system in an eighth embodiment according to the present invention.

As shown in FIG. 9, the control method can be achieved by the circuit configuration with a transmitting power control system 90 and a target power determination system. The target power determination system has a frame error detection unit 91, a frame error count unit 92, a threshold judgement unit 93, a unit for determining the amount of increase and decrease of the target power 94, and a unit for determining the target power 95.

The transmitting power control system 90 consists of a receiving section 900 located at the receiving side and a transmitting section 905 located in the transmitting side, and controls transmitting power at the transmitting side so that a power of a signal transmitted from the section 905 and received by the section 900 becomes equal to a target power applied thereto.

Figure 10:
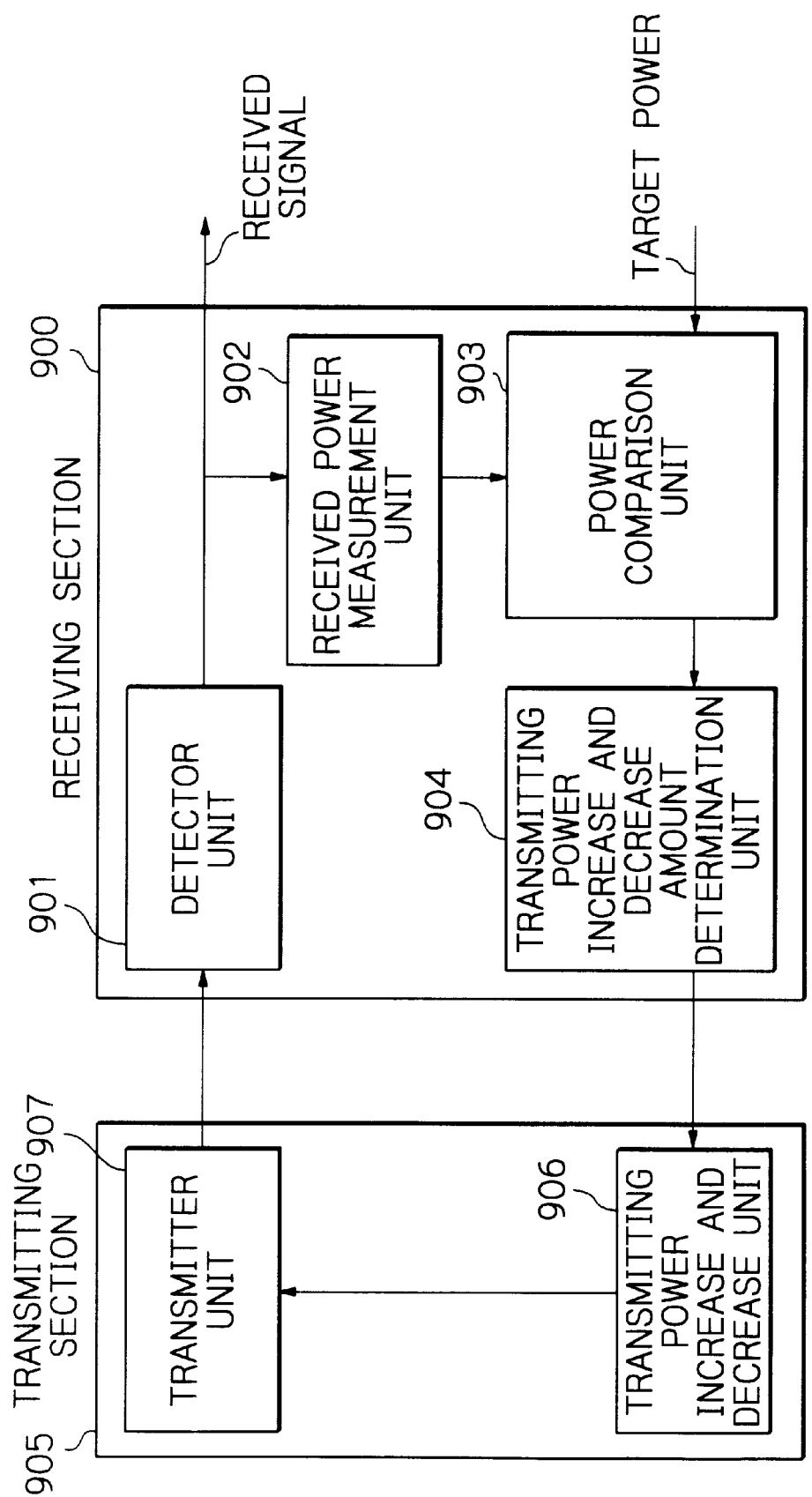
FIG. 10 shows a block diagram schematically illustrating the transmitting power control system shown in FIG. 9.

As shown in FIG. 10, the transmitting power control system 90 has a detector unit 901, a received power measurement unit 902, a power comparison unit 903 and a unit for determining the amount of increase and decrease of transmitting power 904 in the section 900, and also has a transmitting power increase and decrease unit 906 and a transmitter unit 907 in the section 905.

The detector unit 901 in the section 900 receives the signal sent from the transmitter unit 907 in the section 905. The received signal is outputted from the detector unit 901 to the exterior of the transmitting power control system 90 and also outputted to the received power measurement unit 902. At the unit 902, the power of the received signal is measured. At the unit 903, the measured received signal power is compared with a target power provided from the exterior of the transmitting power control system 90 and the result of this comparison is informed to the determination unit 904. The unit 904 determines the amount of increase and decrease of the transmitting power at the transmitting side based on the comparison result of the signal power such as the difference of the signal powers and higher or lower. The determined increase and decrease amount is informed to the unit 906 in the transmitting section 905. The unit 906 increases or decreases the transmitting power at the transmitter unit 907 depending on the informed increase and decrease amount.

Thus, the transmitting power control system 90 controls the transmitting power at the transmitting side so that the power of the signal transmitted from the section 905 and received by the section 900 becomes equal to the target power provided thereto from the exterior.

The target power determination system shown in FIG. 9 determines and provides a proper target power to the transmitting power control system 90. The target power determination system in this first embodiment operates as follows.

The frame error detection unit 91 detects possible frame error in the received signal provided from the transmitting power control system 90 for every frame. Thus, the information about whether a frame error is detected or not is inputted into the frame error count unit 92 for every frame. The unit 92 always counts the number of frame errors in N last frames based on the information inputted for every frame, and outputs the counted value every M frames (N and M are positive integers). The threshold judgement unit 93 compares the inputted counted value or the number of frame errors n with predetermined thresholds t1 and t2 (t1≧t2), and then informs whether it is n≧t1 or not and whether it is n≦t2 or not to the increase and decrease amount determination unit 94 as a comparison result. The unit 94 determines the increase and decrease amount of the power to +S1 when it is n≧t1, determines the increase and decrease amount of target power to −S2 when it is n≦t2, and determines the increase and decrease amount of the power to zero when it is not n≧t1 nor n≦t2. Thus, determined increase and decrease amount of target power is informed to the target power determination unit 95. The unit 95 keeps a value of the target power and outputs the target power value to the transmitting power control system 90. When the increase and decrease amount of target power is informed from the unit 94, the unit 95 adjusts, namely increases or decreases, the kept value of the target power by the informed increase and decrease amount. Then the unit 95 keeps the adjusted value of the target power and outputs the adjusted target power value to the transmitting power control system 90. Thus, as aforementioned, the system 90 controls the transmitting power using the target power value from the unit 95 as a target of the received signal power.

The parameters N, M, t1 and t2 can be set to optional values and it is also possible to modify the values during operations.

By setting the increase and decrease values of target power S1 and S2 to proper values, it is possible to make a long average FER to be equal to a target FER. Namely, the increase and decrease amount of target power S1 and S2 are set to satisfy the following equation;

$$S1 \times P1 = S2 \times P2$$

or $$10^{\wedge}(S1/10) \times P1 + 10^{\wedge}(-S2/10) \times P2 = P1 + P2$$

where P1 is a probability of that relationship of the number of frame errors n with respect to the threshold t1 becomes n≧t1 when the long average FER is equal to the target FER, and P2 is a probability of that relationship of the number of frame errors n with respect to the threshold t2 becomes n≦t2 when the long average FER is equal to the target FER. Thus setting the S1 and S2, the variation of the long target power will become zero when the long average FER is equal to the target FER. If it considers conversely, the long average FER will become almost equal to the target FER under the steady state in which the variation of the long target power is zero.

In case that there is a difference ΔPW between the target power and the required power which satisfies a target frame error rate, the above-mentioned equation will be represented by $$S1 \times P1 - S2 \times P2 = \Delta PW$$

or $$10^{\wedge}(S1/10) \times P1 + 10^{\wedge}(-S2/10) \times P2 + (1 - P1 - P2) = 10^{\wedge}(\Delta PW/10).$$

According to the aforementioned setting method of the power increase and decrease values S1 and S2, since the probabilities P1 and P2 change depending upon the thresholds t1 and t2, the ratio of the values S1 and S2 can be regulated. That is, it can set up to have no extreme difference between the values of S1 and S2, and thus a unnecessary large variation of the target power can be prevented from occurring. In case that the number of the measuring frames N is 1/p or less (p is the target FER), the above-mentioned setting method of S1 and S2 can be used to make the long average FER to a value which is almost equal to the target FER. Namely, by making the number of measuring frames N to some extent small, it is possible to respond to rapid change of the required power. Therefore, this embodiment can solve the previously mentioned first problem.

Ninth Embodiment

Figure 11:
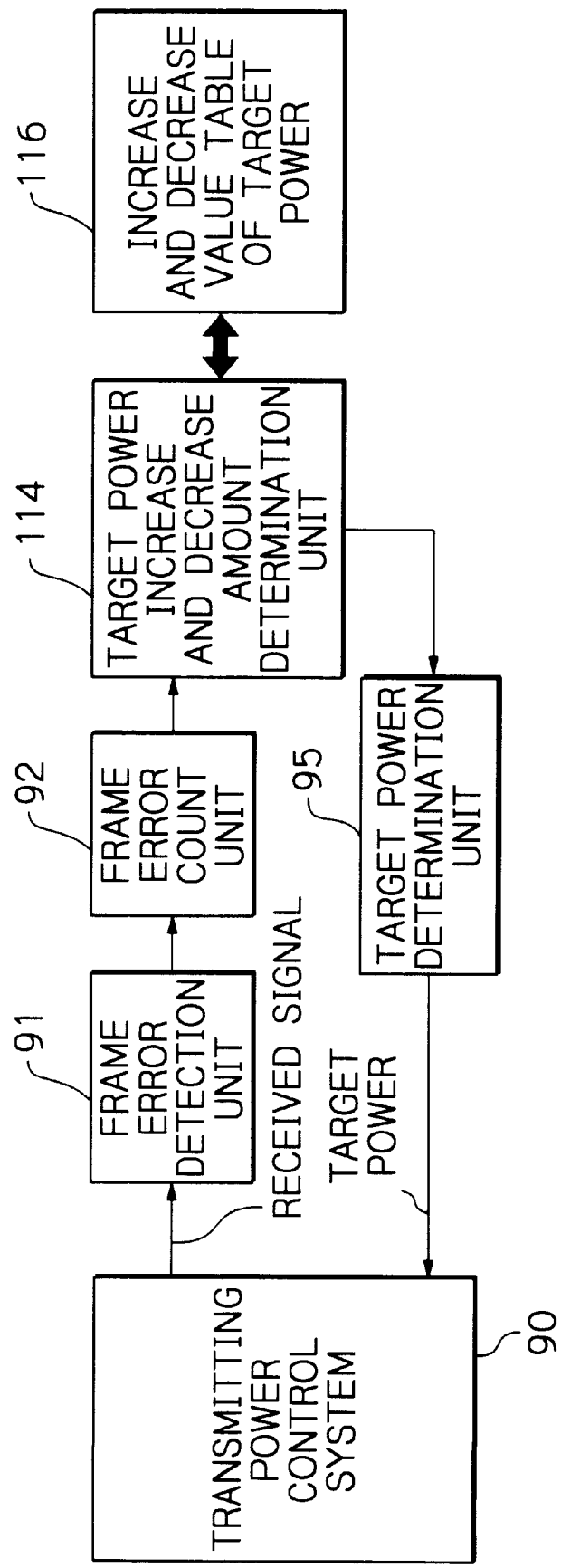
FIG. 11 shows a block diagram schematically illustrating a circuit configuration including a target power determination system and a transmitting power control system in a ninth embodiment according to the present invention.

As shown in FIG. 11, the control method can be also achieved by the circuit configuration with the transmitting power control system 90 and a target power determination system. The target power determination system has the frame error detection unit 91, the frame error count unit 92, a unit for determining the amount of increase and decrease of the target power 114, an increase and decrease value table of target power 116 and the unit for determining the target power 95.

The configurations and operations of the transmitting power control system 90, the frame error detection unit 91, the frame error count unit 92, and the target power determination unit 95 in this embodiment are the same as those with the same references in the eighth embodiment.

In this ninth embodiment, the table 116 preliminarily stores the increase and decrease values of target power S(i) (0≦i≦N) with respect to the number of frame errors n as shown in Table 5. As will be noted from this Table 5, the table 116 stores relationships between n and S(i), for example, S(i) is −0.6 dB when n=1, and S(i) is +1.5 dB when n=3.

TABLE 5

| The number of Frame Errors n | Power Increase and Decrease Value S(i) |
| --- | --- |
| 0 | −1.2 dB |
| 1 | −0.6 dB |
| 2 | 0.0 dB |
| 3 | +1.5 dB |

TABLE 5-continued

| The number of Frame Errors n | Power Increase and Decrease Value S(i) |
|---|---|
| 4 | +2.0 dB |
| 5 | +2.2 dB |
| 6 or more | +2.4 dB |

The increase and decrease amount determination unit 114 determines the increase and decrease amount of the power at each time it recieves the number of frame errors n outputted from the unit 92 for every M frame, by referring the table 116. The determined increase and decrease amount of target power is informed to the target power determination unit 95. When the increase and decrease amount of target power is informed from the unit 94, and unit 95 increases or decreases the value of the target power by the informed increase and decrease amount. Then the unit 95 keeps the adjusted value of the target power and outputs the adjusted target power value to the transmitting power control system 90. Thus, as aforementioned, the system 90 controls the transmitting power using the target power value from the unit 95 as a target of the received signal power.

In this embodiment, the parameters N and M can be set to optional values and it is also possible to modify the values during operations.

By setting the increase and decrease value of target power S(i) ($0 \leq i \leq N$) in the table 116 as follows, it is possible to make a long FER to be equal to a target FER. Namely, the increase and decrease amount of target power S(i) is set to satisfy the following equation;

$$\sum_{i=0}^{N} S(i)P(i) = 0 \text{ or } \sum_{i=0}^{N} 10^{\wedge}(S(i)/10) \times P(i) = 1$$

where P(i) is a probability of that the number of frame errors n becomes equal to i ($0 \leq i \leq N$) when the FER is equal to the target FER.

In case that there is a difference ΔPW between the target power and the required power which satisfies a target frame error rate, the above-mentioned equation will be represented by $$\sum_{i=0}^{N} S(i)P(i) = \Delta PW \text{ or } \sum_{i=0}^{N} 10^{\wedge}(S(i)/10) \times P(i) = 10^{\wedge}(\Delta PW/10).$$

The increase and decrease amount of target power S(i) ($0 \leq i \leq N$) can flexibly set to optional values. By setting the S(i) properly, unnecessary large variation of the target power can be prevented from occurring. As well as executed in the eighth embodiment, by making the number of measuring frames N to some extent small, it is possible to respond to rapid change of the required power in this ninth embodiment. Therefore, this embodiment also can solve the previously mentioned first problem.

In the aforementioned eighth and ninth embodiments, if N is equal to M, process can be simplified because it is only required that the frame error count unit 92 counts and outputs the number of frame errors for every N frame.

Also, in the aforementioned first and second embodiments, it is possible to prevent excess control of the target power by stopping the increasing and decreasing of the target power during N frames just after the target power is once adjusted. This is because, during this N frame period just after the target power is once adjusted, some frame errors produced before the target power is adjusted may be included in the counted frame errors.

Modifications

In the aforementioned first to ninth embodiments, if control of changing on/off of transmission for every frame is performed at the transmitting side as in the DTX (Discontinuous Transmission) control, the receiving side may erroneously judge that a frame error is occurred at the off-transmission frame. If the off-transmission frame which is judged to be frame error is included in the count of the number of frames or the number of frame errors in the outer loop control, it is impossible to obtain keep communication quality which is the purpose of the outer loop control. Thus, by removing the off-transmission frame from the candidate of the count of the number of frames and the number of frame errors in the outer loop control, it is enabled to keep communication quality in such a case and the previously mentioned third problem can be effectively solved.

In order to realize this function in the first to fourth, eighth and ninth embodiments, the number of frames N, N1 and N2, or N (k) except for the off-transmission frame may be controlled at constant, or the number of frames except for the off-transmission frame within a constant period may be considered as the number of frames N, N1 and N2, or N (k) and related parameters t1, t2, S1, S2, or target SIR (or power) increase and decrease value which are set to suitable values depending on the number of frames N, N1 and N2, or N (k) may be used.

In CDMA cellular system, when it is necessary to execute a soft handover or a softer handover, the target SIR (or power) kept in the target SIR determination unit 15 may be varied depending on change in the state of the handover, which is provide by the handover information. For example, in accordance with the state change of the softer handover, the target SIR may be varied by the value indicated in Table 6.

TABLE 6

| | Non-Softer HO (after state change) | Softer HO: 2 sectors (after state change) | Softer HO: 3 sectors (after state change) |
|---|---|---|---|
| Non-Softer HO (before state change) | — | $-\Delta SIR_{12S}$ | $-(\Delta SIR_{12S} + \Delta SIR_{23S})$ |
| Softer HO: 2 sectors (before state change) | $+\Delta SIR_{12S}$ | — | $-\Delta SIR_{23S}$ |
| Softer HO: 3 sectors (before state change) | $+(\Delta SIR_{12S} + \Delta SIR_{23S})$ | $+\Delta SIR_{23S}$ | — |

On the other hand, in accordance with the state change of the soft handover, the target SIR (or power) may be varied by the value indicated in Table 7.

TABLE 7

|  | Non-Soft HO (after state change) | Soft HO: 2 cells (after state change) | Soft HO: 3 cells (after state change) |
|---|---|---|---|
| Non-Soft HO (before state change) | — | $-\Delta SIR_{12C}$ | $-(\Delta SIR_{12C} + \Delta SIR_{23C})$ |
| Soft HO: 2 cells (before state change) | $+\Delta SIR_{12C}$ | — | $-\Delta SIR_{23C}$ |
| Soft HO: 3 cells (before state change) | $+(\Delta SIR_{12C} + \Delta SIR_{23C})$ | $+\Delta SIR_{23C}$ | — |

Thus varying the target SIR (or power), it is possible to satisfy change in the required SIR (or power) and therefore, the previously mentioned fourth problem can be effectively solved.

In modifications of the first to seventh embodiments, the parameters such as the number of frames N, the thresholds t1 and t2, and the target SIR (or power) increase and decrease value, used in the receiving side can be decided or selected at the transmitting side and sent to the receiving side. Such configuration will simplify the constitution of the receiving side and therefore will be very effective when the receiving side is a mobile station.

As aforementioned, the outer loop control method of the present invention considers a frame as a unit of transmitted and received information, and controls a FER to keep at a constant. However, according to the present invention, the outer loop control can be executed by considering any set of information with an optional size or a partial information as one frame. For example, if it is considered that one frame consists of one bit, an outer loop control for keeping a bit error rate at a constant can be provided. In this case, if detection of bit error cannot be executed for all bits, only each of bits that can serve the bit error detection such as a bit with a fixed value should be considered as a frame.

In the aforementioned embodiments and modifications, the present invention is described by using the CDMA cellular system. However, it is apparent that the present invention can be fully or partially applied to any cellular system using a radio communication method other than CDMA.

Also, it is apparent that the transmitting power control method in a cellular system according to the present invention can effectively solve the previously mentioned first to fourth problems.

Particularly, according to the setting method of S1 and S2 of the present invention, since the probabilities P1 and P2 change depending upon the thresholds t1 and t2, the ratio of the values S1 and S2 can be regulated. That is, it can set up to have no extreme difference between the values of S1 and S2, and thus a unnecessary large variation of the target SIR (or power) can be prevented from occurring.

Furthermore, if the number of the measuring frames N is 1/p or less (p is the target FER), the setting method of S1 and S2 can be used to make the long average FER to a value which is almost equal to the target FER. Namely, by making the number of measuring frames N to some extent small, it is possible to respond to rapid change of the required SIR.

The increase and decrease amount of target SIR (or power) S(i) ($0 \leq i \leq N$) or S(i(1), i(2), ..., i(K)) ($0 \leq i(k) \leq N(k)$, $1 \leq k \leq K$) can flexibly set to optional values. By setting the S(i) or S(i(1), i(2), ..., i(K)) properly, unnecessary large variation of the target SIR can be prevented from occurring. By making the number of measuring frames N to some extent small, it is possible to respond to rapid change of the required SIR (or power).

Many widely different embodiments of the present invention may be constructed without departing from the spirit and scope of the present invention. It should be understood that the present invention is not limited to the specific embodiments described in the specification, except as defined in the appended claims.

What is claimed is:

1. A control method of transmitting power in a cellular system with a transmitting side and a receiving side, said method comprising the steps of:

measuring a signal to interference power ratio of a received signal at said receiving side;

detecting frame errors of the received signal at said receiving side;

counting the number of the detected frame errors n(k) (k and n(k) are positive integers and $1 \leq k \leq K$) for every M(k) (M(k) is a positive integer) frames, or for last N(k) (N(k) is a positive integer) frames just before the frame error is detected;

adjusting a value of a target signal to interference power ratio depending on one or set of the counted numbers of frame error n(1) to n(K);

comparing the measured signal to interference power ratio with said adjusted target signal to interference power ratio to provide a compared result; and controlling at said transmitting side the transmitting power depending on the compared result.

2. The method as claimed in claim 1, wherein, in case of K=1, said adjusting step includes comparing the counted number of frame error n(1) with thresholds t1 and t2 ($t1 \geq t2$), increasing the value of the target signal to interference power ratio by a value S1 when $n(1) \geq t1$, and decreasing the value of the target signal to interference power ratio by a value S2 when $n(1) \leq t2$.

3. The method as claimed in claim 2, wherein, in case that there is a difference $\Delta SIR$ between the target signal to interference power ratio and a required signal to interference power ratio which satisfies a target frame error rate, said adjusting step further includes setting said values S1 and S2 to satisfy equation of $$S1 \times P1 - S2 \times P2 = \Delta SIR$$

where P1 is a probability of that relationship of the number of frame errors n(1) with respect to the threshold t1 becomes $n(1) \geq t1$, and P2 is a probability of that relationship of the number of frame errors n(1) with respect to the threshold t2 becomes $n(1) \leq t2$.

4. The method as claimed in claim 3, wherein said difference $\Delta SIR$ is set to a value equal to or higher than −2 dB and lower than 0 dB.

5. The method as claimed in claim 3, wherein said difference $\Delta SIR$ is set to a value equal to or lower than 2 dB and higher than 0 dB.

6. The method as claimed in claim 2, wherein, in case that there is a difference $\Delta SIR$ between the target signal to interference power ratio and a required signal to interference power ratio which satisfies a target frame error rate, said adjusting step further includes setting said values S1 and S2 to satisfy equation of $$10^{(S1/10)} \times P1 + 10^{(-S2/10)} \times P2 + (1 - P1 - P2) = 10^{(\Delta SIR/10)}$$

where P1 is a probability of that relationship of the number of frame errors n(1) with respect to the threshold t1 becomes n(1)≧t1, and P2 is a probability of that relationship of the number of frame errors n(1) with respect to the threshold t2 becomes n(1)≦t2.

7. The method as claimed in claim 6, wherein said difference ΔSIR is set to a value equal to or higher than −2 dB and lower than 0 dB.

8. The method as claimed in claim 6, wherein said difference ΔSIR is set to a value equal to or lower than 2 dB and higher than 0 dB.

9. The method as claimed in claim 2, wherein, said adjusting step further includes setting said values S1 and S2 to satisfy equation of $$S1 \times P1 = S2 \times P2$$

where P1 is a probability of that relationship of the number of frame errors n(1) with respect to the threshold t1 becomes n(1)≧t1 when a frame error rate is equal to the target frame error rate, and P2 is a probability of that relationship of the number of frame errors n(1) with respect to the threshold t2 becomes n(1)≦t2 when the frame error rate is equal to the target frame error rate.

10. The method as claimed in claim 2, wherein said adjusting step further includes setting said values S1 and S2 to satisfy equation of $$10^{\wedge}(S1/10) \times P1 + 10^{\wedge}(-S2/10) \times P2 = P1 + P2$$

where P1 is a probability of that relationship of the number of frame errors n(1) with respect to the threshold t1 becomes n(1)≧t1 when a frame error rate is equal to the target frame error rate, and P2 is a probability of that relationship of the number of frame errors n(1) with respect to the threshold t2 becomes n(1)≦t2 when the frame error rate is equal to the target frame error rate.

11. The method as claimed in claim 2, wherein the thresholds t1 and t2 are time-varying values.

12. The method as claimed in claim 2, wherein the numbers of frames M(k) and N(k), the thresholds t1 and t2, the increase value S1 and the decrease value S2 are informed from said transmitting side to said receiving side.

13. The method as claimed in claim 1, wherein said method further comprises preparing a table for storing increase and decrease values of target signal to interference power ratio corresponding to the number of frame errors n(1), and wherein, in case of K=1, said adjusting step includes obtaining an increase or decrease value from said table depending on a newest number of frame error n(1) when it is updated, and increasing or decreasing the value of the target signal to interference power ratio by the obtained value.

14. The method as claimed in claim 13, wherein, in case that there is a difference ΔSIR between the target signal to interference power ratio and a required signal to interference power ratio which satisfies a target frame error rate, the increase and decrease values of target signal to interference power ratio stored in said table are set to satisfy equation of $$\sum_{i=0}^{N} S(i) \times P(i) = \Delta SIR$$

where P(i) is a probability of that the number of frame errors n(1) becomes equal to i (0≦i≦N=N(1)), and S(i) is the increase and decrease value of the target signal to interference power ratio when the of frame errors n(1) is equal to i (0≦i≦N=N(1)) and when increasing and decreasing are indicated by positive and negative polarities.

15. The method as claimed in claim 14, wherein said difference ΔSIR is set to a value equal to or higher than −2 dB and lower than 0 dB.

16. The method as claimed in claim 14, wherein said difference ΔSIR is set to a value equal to or lower than 2 dB and higher than 0 dB.

17. The method as claimed in claim 13, wherein, in case that there is a difference ΔSIR between the target signal to interference power ratio and a required signal to interference power ratio which satisfies a target frame error rate, the increase and decrease values of target signal to interference power ratio stored in said table are set to satisfy equation of $$\sum_{i=0}^{N} 10^{\wedge}(S(i)/10) \times P(i) = 10^{\wedge}(\Delta SIR/10)$$

where P(i) is a probability of that the number of frame errors n(1) becomes equal to i (0≦i≦N=N(1)), and S(i) is the increase and decrease value of the target signal to interference power ratio when the of frame errors n(1) is equal to i (0≦i≦N=N(1)) and when increasing and decreasing are indicated by positive and negative polarities.

18. The method as claimed in claim 17, wherein said difference ΔSIR is set to a value equal to or higher than −2 dB and lower than 0 dB.

19. The method as claimed in claim 17, wherein said difference ΔSIR is set to a value equal to or lower than 2 dB and higher than 0 dB.

20. The method as claimed in claim 13, wherein the increase and decrease values of target signal to interference power ratio stored in said table are set to satisfy equation of $$\sum_{i=0}^{N} S(i) P(i) = 0$$

where P(i) is a probability of that the number of frame errors n(1) becomes equal to i (0≦i≦N=N(1)) when a frame error rate is equal to the target frame error rate, and S(i) is the increase and decrease value of the target signal to interference power ratio when the of frame errors n(1) is equal to i (0≦i≦N=N(1)) and when increasing and decreasing are indicated by positive and negative polarities.

21. The method as claimed in claim 13, wherein the increase and decrease values of target signal to interference power ratio stored in said table are set to satisfy equation of $$\sum_{i=0}^{N} 10^{\wedge}(S(i)/10) \times P(i) = 1$$

where P(i) is a probability of that the number of frame errors n(1) becomes equal to i (0≦i≦N=N(1)) when a frame error rate is equal to the target frame error rate, and S(i) is the increase and decrease value of the target signal to interference power ratio when the of frame errors n(1) is equal to i (0≦i≦N=N(1)) and when increasing and decreasing are indicated by positive and negative polarities.

22. The method as claimed in claim 13, wherein the numbers of frames M(k) and N(k) and the increase or decrease value are informed from said transmitting side to said receiving side.

23. The method as claimed in claim 1, wherein the number of frames N(1) is equal to the number of frames M(1).

24. The method as claimed in claim 1, wherein said adjusting step is stopped from doing during N(1) frames just after the target signal to interference power ratio is once adjusted.

25. The method as claimed in claim 1, wherein, in case of K=2, said adjusting step includes comparing the counted numbers of frame error n(1) and n(2) with thresholds t1 and t2 (t1≧t2), increasing the value of the target signal to interference power ratio by a value S1 when n(1)≧t1, and decreasing the value of the target signal to interference power ratio by a value S2 when n(2)≦t2.

26. The method as claimed in claim 25, wherein, in case that there is a difference ΔSIR between the target signal to interference power ratio and a required signal to interference power ratio which satisfies a target frame error rate, said adjusting step further includes setting said values S1 and S2 to satisfy equation of $$S1 \times P1 - S2 \times P2 = \Delta SIR$$

where P1 is a probability of that relationship of the number of frame errors n(1) with respect to the threshold t1 becomes n≧t1, and P2 is a probability of that relationship of the number of frame errors n(2) with respect to the threshold t2 becomes n(2)≦t2.

27. The method as claimed in claim 26, wherein said difference ΔSIR is set to a value equal to or higher than −2 dB and lower than 0 dB.

28. The method as claimed in claim 26, wherein said difference ΔSIR is set to a value equal to or lower than 2 dB and higher than 0 dB.

29. The method as claimed in claim 25, wherein, in case that there is a difference ΔSIR between the target signal to interference power ratio and a required signal to interference power ratio which satisfies a target frame error rate, said adjusting step further includes setting said values S1 and S2 to satisfy equation of $$10^{\hat{}}(S1/10) \times P1 + 10^{\hat{}}(-S2/10) \times P2 + (1-P1-P2) = 10^{\hat{}}(\Delta SIR/10)$$

where P1 is a probability of that relationship of the number of frame errors n(1) with respect to the threshold t1 becomes n(1)≧t1, and P2 is a probability of that relationship of the number of frame errors n(2) with respect to the threshold t2 becomes n(2)≦t2.

30. The method as claimed in claim 29, wherein said difference ΔSIR is set to a value equal to or higher than −2 dB and lower than 0 dB.

31. The method as claimed in claim 29, wherein said difference ΔSIR is set to a value equal to or lower than 2 dB and higher than 0 dB.

32. The method as claimed in claim 25, wherein said adjusting step further includes setting said values S1 and S2 to satisfy equation of $$S1 \times P1 = S2 \times P2$$

where P1 is a probability of that relationship of the number of frame errors n(1) with respect to the threshold t1 becomes n(1)≧t1 when a frame error rate is equal to the target frame error rate, and P2 is a probability of that relationship of the number of frame errors n(2) with respect to the threshold t2 becomes n(2)≦t2 when the frame error rate is equal to the target frame error rate.

33. The method as claimed in claim 25, wherein said adjusting step further includes setting said values S1 and S2 to satisfy equation of $$10^{\hat{}}(S1/10) \times P1 + 10^{\hat{}}(-S2/10) \times P2 = P1 + P2$$

where P1 is a probability of that relationship of the number of frame errors n(1) with respect to the threshold t1 becomes n(1)≧t1 when a frame error rate is equal to the target frame error rate, and P2 is a probability of that relationship of the number of frame errors n(2) with respect to the threshold t2 becomes n(2)≦t2 when the frame error rate is equal to the target frame error rate.

34. The method as claimed in claim 25, wherein said adjusting step is stopped from doing during N(1) frames just after the target signal to interference power ratio is once increased and during N(2) frames just after the target signal to interference power ratio is once decreased.

35. The method as claimed in claim 25, wherein the numbers of frames M(k) and N(k), the thresholds t1 and t2, the increase value S1 and the decrease value S2 are informed from said transmitting side to said receiving side.

36. The method as claimed in claim 1, wherein said method further comprises preparing a table for storing increase and decrease values of target signal to interference power ratio corresponding to a set of the numbers of frame errors (n(1), n(2), ..., n(K)), and wherein said adjusting step includes obtaining an increase or decrease value from said table depending on a newest set of the numbers of frame error (n(1), n(2), ..., n(K)) when one of the numbers of frame errors n(1), n(2), ..., n(K) is updated, and increasing or decreasing the value of the target signal to interference power ratio by the obtained value.

37. The method as claimed in claim 36, wherein, in case that there is a difference ΔSIR between the target signal to interference power ratio and a required signal to interference power ratio which satisfies a target frame error rate, the increase and decrease values of target signal to interference power ratio stored in said table are set to satisfy equation of $$\sum_{i(1)=0}^{N(1)} \sum_{i(2)=0}^{N(2)} \ldots \sum_{i(K)=0}^{N(K)} S(i(1), i(2), \ldots, i(K)) \times P(i(1), i(2), \ldots, i(K)) = \Delta SIR$$

where P(i(1), i(2), ..., i(K)) (0≦i(k)≦N(k), 1≦k≦K) is a probability of that the set of the numbers of frame errors (n(1), n(2), ..., n(K)) becomes equal to (i(1), i(2), ..., i(K)), and S(i(1), i(2), ..., i(K)) is the increase and decrease value of target signal to interference power ratio when the set of the numbers of frame errors (n(1), n(2), ..., n(K)) is equal to (i(1), i(2), ..., i(K)) and when increasing and decreasing are indicated by positive and negative polarities, respectively.

38. The method as claimed in claim 37, wherein said difference ΔSIR is set to a value equal to or higher than −2 dB and lower than 0 dB.

39. The method as claimed in claim 37, wherein said difference ΔSIR is set to a value equal to or lower than 2 dB and higher than 0 dB.

40. The method as claimed in claim 36, wherein, in case that there is a difference ΔSIR between the target signal to interference power ratio and a required signal to interference power ratio which satisfies a target frame error rate, the increase and decrease values of target signal to interference power ratio stored in said table are set to satisfy equation of $$\sum_{i(1)=0}^{N(1)} \sum_{i(2)=0}^{N(2)} \ldots \sum_{i(K)=0}^{N(K)} 10^{\wedge}(S(i(1), i(2), \ldots, i(K))/10) \times P(i(1), i(2), \ldots, i(K)) =$$

-continued $$10^{\wedge}(\Delta SIR/10)$$

where P(i(1), i(2), ..., i(K)) (0≦i(k)≦N(k), 1≦k≦K) is a probability of that the set of the numbers of frame errors (n(1), n(2), ..., n(K)) becomes equal to (i(1), i(2), ..., i(K)), and S(i(1), i(2), ..., i(K)) is the increase and decrease value of target signal to interference power ratio when the set of the numbers of frame errors (n(1), n(2), ..., n(K)) is equal to (i(1), i(2), ..., i(K)) and when increasing and decreasing are indicated by positive and negative polarities, respectively.

41. The method as claimed in claim 40, wherein said difference ΔSIR is set to a value equal to or higher than −2 dB and lower than 0 dB.

42. The method as claimed in claim 40, wherein said difference ΔSIR is set to a value equal to or lower than 2 dB and higher than 0 dB.

43. The method as claimed in claim 36, wherein the increase and decrease values of target signal to interference power ratio stored in said table are set to satisfy equation of $$\sum_{i(1)=0}^{N(1)} \sum_{i(2)=0}^{N(2)} \ldots \sum_{i(K)=0}^{N(K)} S(i(1), i(2), \ldots, i(K)) P(i(1), i(2), \ldots, i(K)) = 0$$

where P(i(1), i(2), ..., i(K)) (0≦i(k)≦N(k), 1≦k≦K) is a probability of that the set of the numbers of frame errors (n(1), n(2), ..., n(K)) becomes equal to (i(1), i(2), ..., i(K)) when a frame error rate is equal to the target frame error rate, and S(i(1), i(2), ..., i(K)) is the increase and decrease value of target signal to interference power ratio when the set of the numbers of frame errors (n(1), n(2), ..., n(K)) is equal to (i(1), i(2), ..., i(K)) and when increasing and decreasing are indicated by positive and negative polarities, respectively.

44. The method as claimed in claim 36, wherein the increase and decrease values of target signal to interference power ratio stored in said table are set to satisfy equation of $$\sum_{i(1)=0}^{N(1)} \sum_{i(2)=0}^{N(2)} \ldots \sum_{i(K)=0}^{N(K)} 10^{\wedge}(S(i(1), i(2), \ldots, i(K))/10) \times P(i(1), i(2), \ldots, i(K)) = 1$$

where P(i(1), i(2), ..., i(K)) (0≦i(k)≦N(k), 1≦k≦K) is a probability of that the set of the numbers of frame errors (n(1), n(2), ..., n(K)) becomes equal to (i(1), i(2), ..., i(K)) when a frame error rate is equal to the target frame error rate, and S(i(1), i(2), ..., i(K)) is the increase and decrease value of target signal to interference power ratio when the set of the numbers of frame errors (n(1), n(2), ..., n(K)) is equal to (i(1), i(2), ..., i(K)) and when increasing and decreasing are indicated by positive and negative polarities, respectively.

45. The method as claimed in claim 36, wherein said adjusting step is stopped from doing during frames just after the target signal to interference power ratio is once adjusted.

46. The method as claimed in claim 36, wherein the numbers of frames M(k) and N(k) and the increase or decrease value are informed from said transmitting side to said receiving side.

47. The method as claimed in claim 1, wherein said method further comprises preparing a table for storing increase and decrease values of target signal to interference power ratio corresponding to the numbers of frame errors n(1), n(2), ..., n(K), respectively, and wherein said adjusting step includes obtaining an increase or decrease value from said table depending on a newest one n(k) of the numbers of frame error n(1), n(2), ..., n(K) when the number of frame errors n(k) is updated, and increasing or decreasing the value of the target signal to interference power ratio by the obtained value.

48. The method as claimed in claim 47, wherein, in case that there is a difference ΔSIR between the target signal to interference power ratio and a required signal to interference power ratio which satisfies a target frame error rate, the increase and decrease values of target signal to interference power ratio stored in said table are set to satisfy equation of $$\sum_{k=0}^{K} \sum_{i(k)=0}^{N(k)} \frac{1}{M(k)} S(k, i(k)) \times P(k, i(k)) = \Delta SIR$$

where P(k, i(k)) is a probability of that the number of frame errors during N(k) frames n(k) becomes equal to i(k) (0≦i(k)≦N(k)), and S(k, i(K)) is the increase and decrease value of target signal to interference power ratio when the number of frame errors n(k) is equal to i(k) and when increasing and decreasing are indicated by positive and negative polarities, respectively.

49. The method as claimed in claim 48, wherein said difference ΔSIR is set to a value equal to or higher than −2 dB and lower than 0 dB.

50. The method as claimed in claim 48 wherein said difference ΔSIR is set to a value equal to or lower than 2 dB and higher than 0 dB.

51. The method as claimed in claim 47, wherein, in case that there is a difference ΔSIR between the target signal to interference power ratio and a required signal to interference power ratio which satisfies a target frame error rate, the increase and decrease values of target signal to interference power ratio stored in said table are set to satisfy equation of $$\sum_{k=0}^{K} \sum_{i(k)=0}^{N(k)} \frac{1}{M(k)} 10^{\wedge} S(k, i(k))/10) \times P(k, i(k)) = 10^{\wedge}(\Delta SIR/10)$$

where P(k, i(k)) is a probability of that the number of frame errors during N(k) frames n(k) becomes equal to i(k) (0≦i(k)≦N(k)), and S(k, i(K)) is the increase and decrease value of target signal to interference power ratio when the number of frame errors n(k) is equal to i(k) and when increasing and decreasing are indicated by positive and negative polarities, respectively.

52. The method as claimed in claim 51, wherein said difference ΔSIR is set to a value equal to or higher than −2 dB and lower than 0 dB.

53. The method as claimed in claim 51, wherein said difference ΔSIR is set to a value equal to or lower than 2 dB and higher than 0 dB.

54. The method as claimed in claim 47, wherein the increase and decrease values of target signal to interference power ratio stored in said table are set to satisfy equation of $$\sum_{k=1}^{K} \sum_{i(k)=0}^{N(k)} \frac{1}{M(k)} S(k, i(k)) \times P(k, i(k)) = 0$$

where P(k, i(k)) is a probability of that the number of frame errors during N(k) frames n(k) becomes equal to i(k) (0≦i (k)≦N(k)) when a frame error rate is equal to the target frame error rate, and S(k, i(K)) is the increase and decrease value of target signal to interference power ratio when the number of frame errors n(k) is equal to i(k) and when increasing and decreasing are indicated by positive and negative polarities, respectively.

55. The method as claimed in claim 47, wherein the increase and decrease values of target signal to interference power ratio stored in said table are set to satisfy equation of $$\sum_{k=0}^{K}\sum_{i(k)=0}^{N(k)}\frac{1}{M(k)}10\wedge S(k, i(k)/10) \times P(k, i(k)) = 1$$

where P(k, i(k)) is a probability of that the number of frame errors during N(k) frames n(k) becomes equal to i(k) (0≦i (k)≦N(k)) when a frame error rate is equal to the target frame error rate, and S(k, i(K)) is the increase and decrease value of target signal to interference power ratio when the number of frame errors n(k) is equal to i(k) and when increasing and decreasing are indicated by positive and negative polarities, respectively.

56. The method as claimed in claim 47, wherein said adjusting step is stopped from doing during frames just after the target signal to interference power ratio is once adjusted.

57. The method as claimed in claim 47, wherein the numbers of frames M(k) and N(k) and the increase or decrease value are informed from said transmitting side to said receiving side.

58. The method as claimed in claim 1, wherein said transmitting side executes control of changing on/off of transmission for every frame, and wherein said method further includes a step of removing the off-transmission frame from the counted number of frames and also from the counted number of frame errors, and a step of controlling the number of frames N(k) except for the off-transmission frame at constant.

59. The method as claimed in claim 1, wherein the numbers of frames M(k) and N(k) are time-varying values.

60. A control method of transmitting power in a cellular system with a transmitting side and a receiving side, said method comprising the steps of:
   measuring a signal to interference power ratio of a received signal at said receiving side;
   detecting frame errors of the received signal at said receiving side;
   counting the number of frames until the number of the detected frame errors becomes m (m is a positive integer) to provide a counted number of frames C each time m frame errors being detected;
   adjusting a value of a target signal to interference power ratio depending on the counted number of frames C;
   comparing the measured signal to interference power ratio with said adjusted target signal to interference power ratio to provide a compared result; and
   controlling at said transmitting side the transmitting power depending on the compared result.

61. The method as claimed in claim 60, wherein said adjusting step includes comparing the counted number of frames C with thresholds t1 and t2 (t1≦t2), increasing the value of the target signal to interference power ratio by a value S1 when C≦t1, and decreasing the value of the target signal to interference power ratio by a value S2 when C≧t2.

62. The method as claimed in claim 61, wherein, in case that there is a difference ΔSIR between the target signal to interference power ratio and a required signal to interference power ratio which satisfies a target frame error rate, said adjusting step further includes setting said values S1 and S2 to satisfy equation of $$S1 \times P1 - S2 \times P2 = \Delta SIR$$

where P1 is a probability of that relationship of the number of frame errors n with respect to the threshold t1 becomes n≧t1, and P2 is a probability of that relationship of the number of frame errors n with respect to the threshold t2 becomes n≦t2.

63. The method as claimed in claim 62, wherein said difference ΔSIR is set to a value equal to or higher than −2 dB and lower than 0 dB.

64. The method as claimed in claim 62, wherein said difference ΔSIR is set to a value equal to or lower than 2 dB and higher than 0 dB.

65. The method as claimed in claim 61, wherein, in case that there is a difference ΔSIR between the target signal to interference power ratio and a required signal to interference power ratio which satisfies a target frame error rate, said adjusting step further includes setting said values S1 and S2 to satisfy equation of $$10^{\wedge}(S1/10) \times P1 + 10^{\wedge}(-S2/10) \times P2 + (1-P1-P2) = 10^{\wedge}(\Delta SIR/10)$$

where P1 is a probability of that relationship of the number of frame errors n with respect to the threshold t1 becomes n≧t1, and P2 is a probability of that relationship of the number of frame errors n with respect to the threshold t2 becomes n≦t2.

66. The method as claimed in claim 65, wherein said difference ΔSIR is set to a value equal to or higher than −2 dB and lower than 0 dB.

67. The method as claimed in claim 65, wherein said difference ΔSIR is set to a value equal to or lower than 2 dB and higher than 0 dB.

68. The method as claimed in claim 61, wherein said adjusting step further includes setting said values S1 and S2 to satisfy equation of $$S1 \times P1 = S2 \times P2$$

where P1 is a probability of that relationship of the counted number of frames C with respect to the threshold t1 becomes C≦t1 when a frame error rate is equal to the target frame error rate, and P2 is a probability of that relationship of the counted number of frames C with respect to the threshold t2 becomes C≧t2 when the frame error rate is equal to the target frame error rate.

69. The method as claimed in claim 61, wherein said adjusting step further includes setting said values S1 and S2 to satisfy equation of $$10^{\wedge}(S1/10) \times P1 + 10^{\wedge}(-S2/10) \times P2 = P1 + P2$$

where P1 is a probability of that relationship of the counted number of frames C with respect to the threshold t1 becomes C≦t1 when a frame error rate is equal to the target frame error rate, and P2 is a probability of that relationship of the counted number of frames C with respect to the threshold t2 becomes C≧t2 when the frame error rate is equal to the target frame error rate.

70. The method as claimed in claim 61, wherein the value m, the thresholds t1 and t2, the increase value S1 and the decrease value S2 are informed from said transmitting side to said receiving side.

71. The method as claimed in claim 60, wherein said method further comprises preparing a table for storing increase and decrease values of target signal to interference power ratio corresponding to the number of frames C, and wherein said adjusting step includes obtaining an increase or decrease value from said table depending on a newest number of frames C when it is updated, and increasing or decreasing the value of the target signal to interference power ratio by the obtained value.

72. The method as claimed in claim 71, wherein the increase and decrease values of target signal to interference power ratio stored in said table are set to satisfy equation of $$\sum_{i=m}^{\infty} S(i)P(i) = 0$$

where P(i) is a probability of that the number of frames C becomes equal to i (m≦i) when a frame error rate is equal to the target frame error rate, and S(i) is the increase and decrease value of target signal to interference power ratio when the number of frames C is equal to i and when increasing and decreasing are indicated by positive and negative polarities, respectively.

73. The method as claimed in claim 71, wherein the value m and the increase or decrease value are informed from said transmitting side to said receiving side.

74. The method as claimed in claim 60, wherein said transmitting side executes control of changing on/off of transmission for every frame, and wherein said method further includes a step of removing the off-transmission frame from the counted number of frames and also from the counted number of frame errors, and a step of controlling the number of frame errors m except for the off-transmission frame at constant.

75. The method as claimed in claim 60, wherein said transmitting side executes control of changing on/off of transmission for every frame, and wherein said method further includes a step of removing the off-transmission frame from the counted number of frames and also from the counted number of frame errors, and a step of regarding the number of frames except for the off-transmission frame within a period as the number of frames N(k).

76. The method as claimed in claim 60, wherein the value m is a time-varying value.

77. A control method of transmitting power in a cellular system with a transmitting side and a receiving side, said method comprising the steps of:
measuring a signal to interference power ratio of a received signal at said receiving side;
detecting frame errors of the received signal at said receiving side;
adjusting a value of a target signal to interference power ratio depending on the detected frame errors;
comparing the measured signal to interference power ratio with said target signal to interference power ratio to provide a compared result;
controlling at said transmitting side the transmitting power depending on the compared result;
judging at said receiving side whether the controlled transmitting power at said transmitting side is at a lower limit level; and
prohibiting said adjustment of the value of the target signal to interference power ratio when said judging step judges that the transmitting power is at the lower limit level.

78. The method as claimed in claim 77, wherein said method further comprises a step of sending information indicating that the controlled transmitting power at said transmitting side is at the lower limit level from said transmitting side to said receiving side, and wherein said judging step includes judging that the controlled transmitting power is at the lower limit level when said information is received at said receiving side.

79. The method as claimed in claim 77, wherein said judging step includes monitoring that the measured signal to interference power ratio is higher than said target signal to interference power ratio, and judging that the controlled transmitting power is at the lower limit level when the measured signal to interference power ratio is higher than said target signal to interference power ratio for a predetermined period or more.

80. A control method of transmitting power in a cellular system with a transmitting side and a receiving side, said cellular system adopting functions of soft handover or softer handover, said method comprising the steps of:
measuring a signal to interference power ratio of a received signal at said receiving side;
detecting change in the number of connecting cells due to the soft handover or the softer handover;
adjusting a value of a target signal to interference power ratio depending on the detected change of the number of the connecting cells;
comparing the measured signal to interference power ratio with said target signal to interference power ratio to provide a compared result; and
controlling at said transmitting side the transmitting power depending on the compared result.

81. A control method of transmitting power in a cellular system with a transmitting side and a receiving side, said cellular system adopting functions of soft handover or softer handover, said method comprising the steps of:
measuring a signal to interference power ratio of a received signal at said receiving side;
detecting change in the number of connecting cells due to the soft handover or the softer handover;
adjusting a value of a target signal to interference power ratio depending on the detected change of the number of the connecting cells and on kind of the handovers;
comparing the measured signal to interference power ratio with said target signal to interference power ratio to provide a compared result; and
controlling at said transmitting side the transmitting power depending on the compared result.

82. A control method of transmitting power in a cellular system with a transmitting side and a receiving side, said method comprising the steps of:
measuring a power of a received signal at said receiving side;
detecting frame errors of the received signal at said receiving side;
counting the number of the detected frame errors n(k) (k and n(k) are positive integers and 1≦k≦K) for every M(k) (M(k) is a positive integer) frames, or for last N(k) (N(k) is a positive integer) frames just before the frame error is detected;
adjusting a value of a target power depending on one or set of the counted numbers of frame error n(1) to n(K);
comparing the measured received signal power with said adjusted target power to provide a compared result; and
controlling at said transmitting side the transmitting power depending on the compared result.

83. The method as claimed in claim 82, wherein, in case of K=1, said adjusting step includes comparing the counted number of frame error n(1) with thresholds t1 and t2 (t1≧t2), increasing the value of the target power by a value S1 when n(1)≧t1, and decreasing the value of the target power by a value S2 when n(1)≦t2.

84. The method as claimed in claim 83, wherein, said adjusting step further includes setting said values S1 and S2 to satisfy equation of $$S1 \times P1 = S2 \times P2$$

where P1 is a probability of that relationship of the number of frame errors n(1) with respect to the threshold t1 becomes n(1)≧t1 when a frame error rate is equal to the target frame error rate, and P2 is a probability of that relationship of the number of frame errors n(1) with respect to the threshold t2 becomes n(1)≦t2 when the frame error rate is equal to the target frame error rate.

85. The method as claimed in claim 82, wherein said method further comprises preparing a table for storing increase and decrease values of target power corresponding to the number of frame errors n(1), and wherein, in case of K=1, said adjusting step includes obtaining an increase or decrease value from said table depending on a newest number of frame error n(1) when it is updated, and increasing or decreasing the value of the target power by the obtained value.

86. The method as claimed in claim 85, wherein the increase and decrease values of target power stored in said table are set to satisfy equation of $$\sum_{i=0}^{N} S(i)P(i) = 0$$

where P(i) is a probability of that the number of frame errors n(1) becomes equal to i (0≦i≦N=N(1)) when a frame error rate is equal to the target frame error rate, and S(i) is the increase and decrease value of the target power when the of frame errors n(1) is equal to i (0≦i≦N=N(1)) and when increasing and decreasing are indicated by positive and negative polarities.

* * * * *